(12) United States Patent
Takahashi et al.

(10) Patent No.: US 7,721,563 B2
(45) Date of Patent: May 25, 2010

(54) APPARATUS FOR AND METHOD OF CALCULATING TORQUE OF VARIABLE CAPACITY COMPRESSOR

(75) Inventors: Eiji Takahashi, Ashikaga (JP); Masaki Kawachi, Ashikaga (JP); Masanori Ogawa, Sano (JP); Hirofumi Muto, Wako (JP); Daisuke Shimizu, Wako (JP)

(73) Assignees: Calsonic Kansei Corporation, Tokyo (JP); Honda Motor Co., Ltd., Tokyo (JP)

( * ) Notice: Subject to any disclaimer, the term of this patent is extended or adjusted under 35 U.S.C. 154(b) by 917 days.

(21) Appl. No.: 11/440,452

(22) Filed: May 25, 2006

(65) Prior Publication Data
US 2006/0272343 A1 Dec. 7, 2006

(30) Foreign Application Priority Data
May 25, 2005 (JP) ............................. P2005-153180

(51) Int. Cl.
F25B 49/00 (2006.01)
F01B 3/00 (2006.01)
F04B 1/26 (2006.01)

(52) U.S. Cl. ........................ 62/228.1; 62/228.2; 92/12.2; 417/222.1; 417/222.2

(58) Field of Classification Search ................. 62/228.1, 62/228.2; 92/12.2; 417/222.1, 222.2
See application file for complete search history.

(56) References Cited

U.S. PATENT DOCUMENTS 4,356,705 A * 11/1982 Sutoh et al. .................... 62/229

2004/0057840 A1 * 3/2004 Hirota ..................... 417/222.2

FOREIGN PATENT DOCUMENTS

| DE | 10 2004 004028 | 8/2004 |
|---|---|---|
| EP | 1 243 449 | 9/2002 |
| EP | 1 437 245 | 7/2004 |
| EP | 1 609 642 | 12/2005 |
| JP | 5-099156 A | 4/1993 |
| JP | 2001-121952 A | 5/2001 |
| JP | 2001-317467 A | 11/2001 |
| JP | 2003-278660 A | 10/2003 |
| JP | 2004-211663 A | 7/2004 |

* cited by examiner

Primary Examiner—Thomas E Denion
Assistant Examiner—Michael Carton
(74) Attorney, Agent, or Firm—Antonelli, Terry, Stout & Kraus, LLP.

(57) ABSTRACT

An apparatus for calculating torque of a variable capacity compressor, including: a sensor configured to detect internal and external states of an air conditioner; an OFF-torque calculator configured to calculate and store a steady-state torque according to a state detected by the sensor just before a clutch is turned off; a start torque calculator configured to calculate a start torque according to a state detected by the sensor after the clutch is turned on; a steady-state full-stroke calculator configured to calculate a steady-state full-stroke torque based on an assumption that the compressor was in a full-stroke-state according to a state detected by the sensor after the clutch is turned on; and a determiner configured to provide, when an elapsed time after the clutch is turned on is less than a predetermined time, a maximum one of the torque values calculated by the OFF-torque calculator, start torque calculator, and steady-state full-stroke calculator.

10 Claims, 17 Drawing Sheets

APPARATUS FOR AND METHOD OF CALCULATING TORQUE OF VARIABLE CAPACITY COMPRESSOR

CROSS REFERENCE TO RELATED APPLICATIONS AND INCORPORATION BY REFERENCE

This application is based on and claims the benefit of priority from the prior Japanese Patent Application No. 2005-153180 filed on May 25, 2005; the entire contents thereof are incorporated herein by reference.

BACKGROUND OF THE INVENTION

1. Field of the Invention

The present invention relates to a method of and an apparatus for calculating torque of a variable capacity compressor arranged in a refrigeration cycle.

2. Description of Related Art

A variable capacity compressor is utilized in a refrigeration cycle of, for example, an air conditioner of a vehicle. In the vehicle, the compressor is connected to a vehicle engine by an endless belt. The belt connects a main pulley fixed to a drive shaft of the engine to a follower pulley fixed to a drive shaft of the compressor. The engine serves as a driving source for driving the compressor. If the compressor varies its coolant discharge capacity, the load on the engine varies, which may cause an engine stall during an idling operating. To prevent this, an engine controller must control an intake air quantity (fuel mixture supply quantity) in response to the load (torque) of the compressor. To achieve this, the engine controller must know the torque of the compressor. For this, there have been proposed various compressor torque calculating apparatuses, such as those disclosed in Japanese Unexamined Patent Application Publications No. Hei-5-99156, No. 2004-211663, and No. 2003-278660.

Among these torque calculation apparatuses, Japanese Unexamined Patent Application Publications No. Hei-5-99156 calculates a coolant flow rate according to information (a high pressure in a refrigeration cycle, a coolant temperature in a condenser, an ambient temperature, and the like), and according to the calculated coolant flow rate, estimates torque of the compressor. The torque estimated by this related art is a steady-state torque, i.e., an operating torque of the compressor during a period in which a refrigeration cycle is steadily passing coolant.

SUMMARY OF THE INVENTION

In a short period at the start of operation of the variable capacity compressor, for example, in a period of about four seconds after the start of the compressor, the flow of coolant is unstable, and therefore, it is impossible for the related art to estimate torque based on a coolant flow rate. When the compressor is stopped, coolant in the compressor changes its pressure to an equilibrium state. During the pressure changing period, a piston in the compressor is moving, and therefore, it is difficult to estimate the position of the piston, and therefore, it is impossible to estimate a start torque of the compressor when the compressor is restarted soon after being stopped. Due to this, some related art compressor controllers prohibit activation of the compressor for ten seconds after the compressor is stopped. This is inconvenient in terms of free control of the compressor. The compressor must be turned on and off whenever required.

The present invention provides an apparatus for and a method of calculating torque of a variable capacity compressor, capable of calculating the torque even when the compressor is restarted just after being stopped, thereby stabilizing the operation of an engine which drives the compressor An aspect of the present invention provides an apparatus for calculating torque of a variable capacity compressor. The apparatus includes a sensor configured to detect internal and external states of an air conditioner, an OFF-torque calculator configured to calculate and store a steady-state torque according to a state detected by the sensor just before a drive clutch is turned off, a start torque calculator configured to calculate a start torque according to a state detected by the sensor after the clutch is turned on, a steady-state full-stroke calculator configured to calculate a steady-state full-stroke torque on an assumption that the compressor was in a full-stroke state according to a state detected by the sensor after the clutch is turned on, and a determiner configured to provide, when an elapsed time after the clutch is turned on is less than a predetermined time, a maximum one of the torque values calculated by the OFF-torque calculator, start torque calculator, and steady-state full-stroke calculator.

DETAILED DESCRIPTION OF EMBODIMENTS

Figure 1:
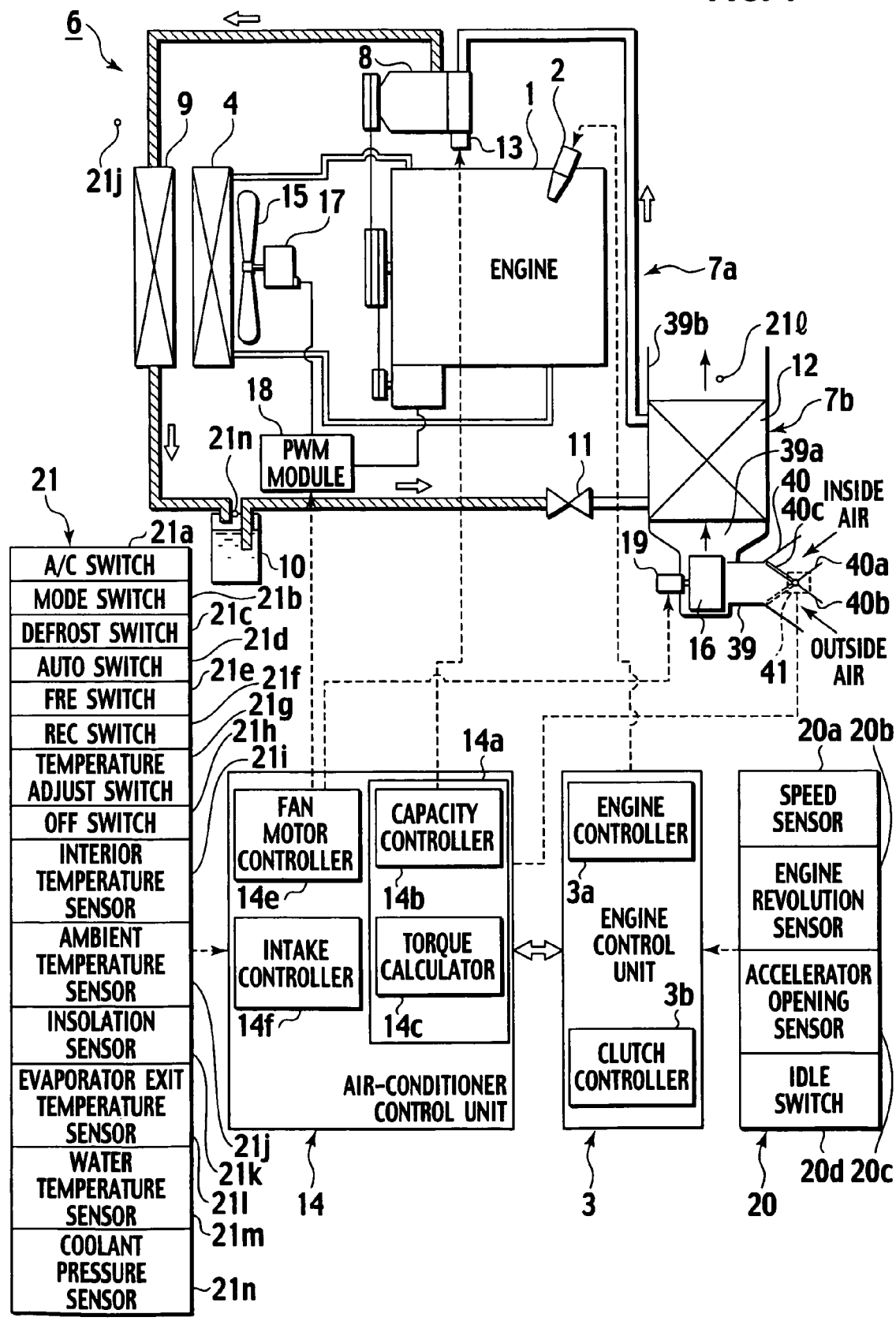
FIG. 1 is a view generally showing a vehicle air conditioner according to an embodiment of the present invention.
Figure 2:
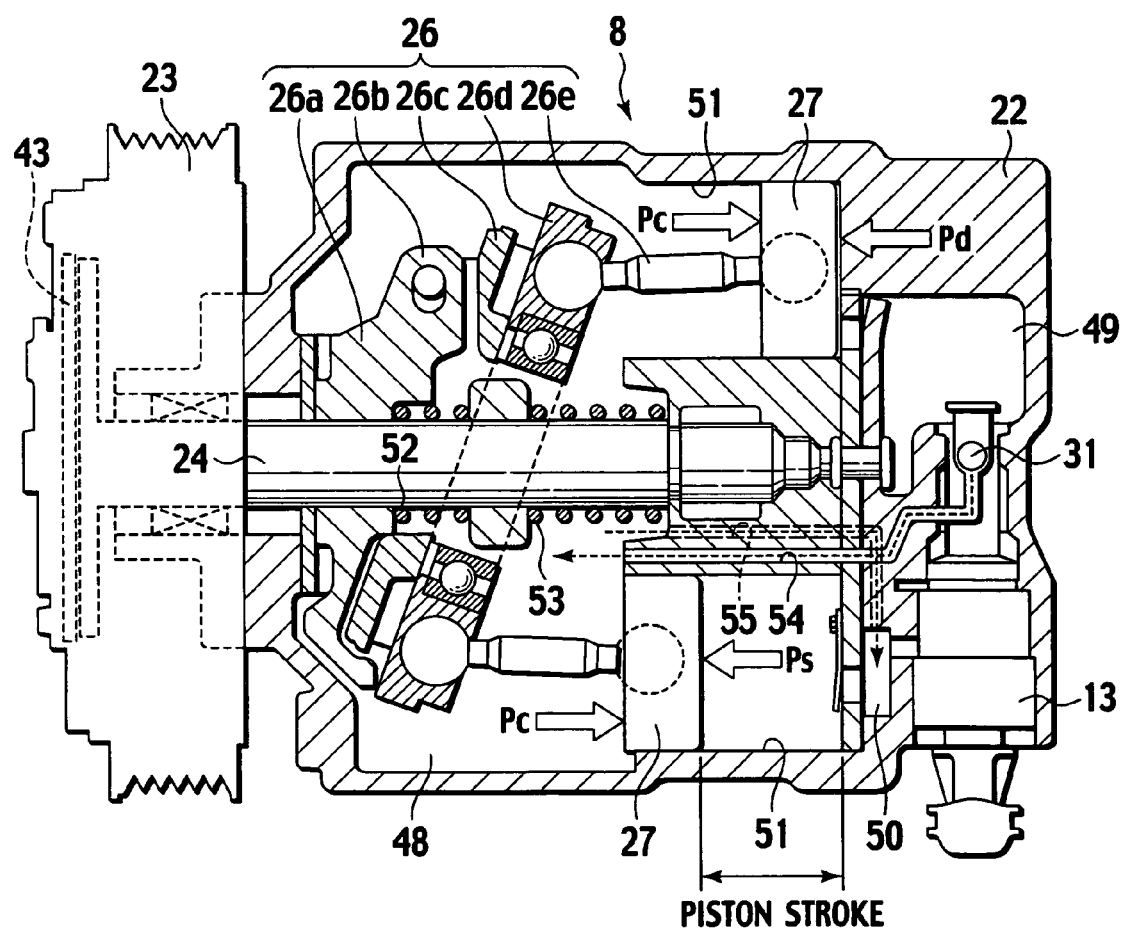
FIG. 2 is a sectional view showing a variable capacity compressor of the air conditioner of FIG. 1.
Figure 3:
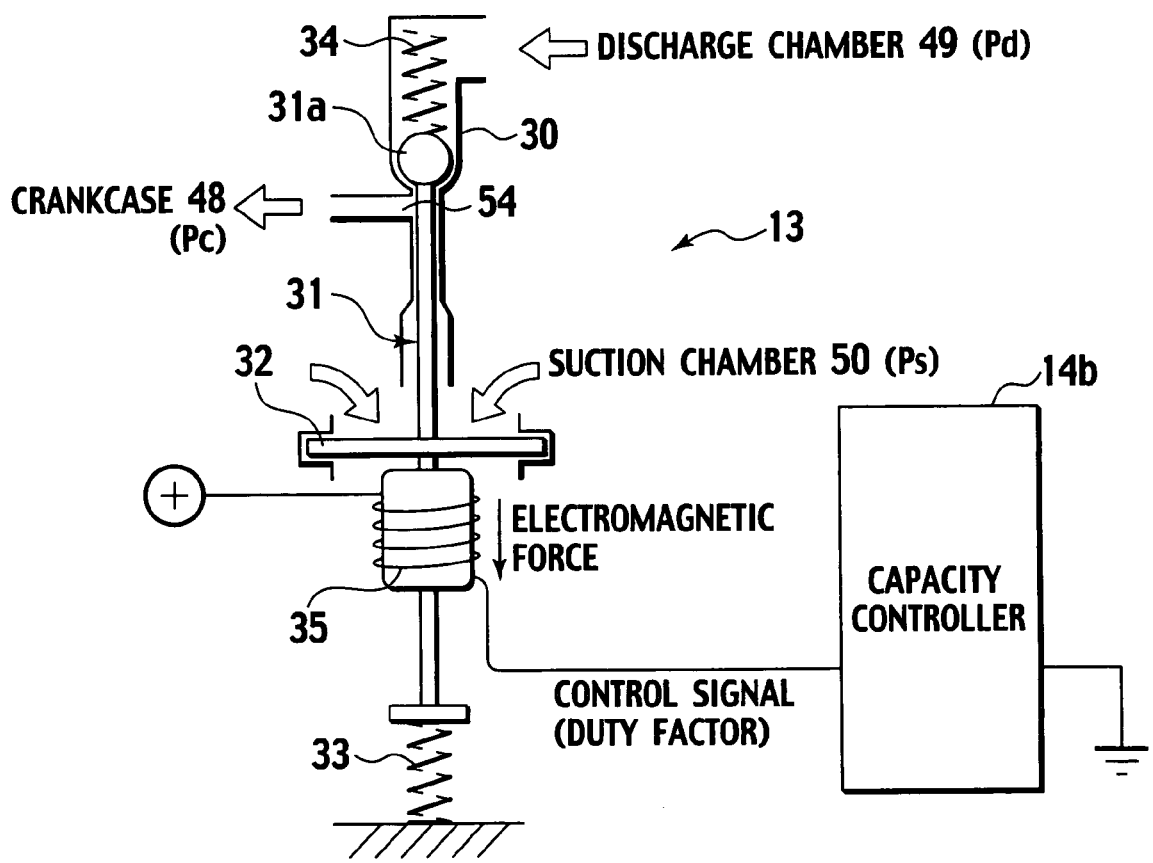
FIG. 3 is a view explaining a capacity changing mechanism of the compressor of FIG. 2.

An apparatus for and a method of calculating torque of a variable capacity compressor according to embodiments of the present invention will be explained with reference to FIGS. 1 to 17. FIG. 1 is a view generally showing an air conditioner 6 installed in a vehicle for which the present invention is applied, FIG. 2 is a sectional view showing a variable capacity compressor 8 for the air conditioner 6, and FIG. 3 is a view explaining a capacity changing mechanism of the compressor 8.

In FIG. 1, an engine 1 of the vehicle has a fuel injector 2 for injecting fuel. An opening of the fuel injector 2 is adjustable to change air supply (fuel mixture supply) to a cylinder bore of the engine and control revolutions of the engine 1. The engine 1 is connected through cooling water piping (not represented with a specific reference numeral) to a radiator 4 that radiates heat of the engine 1.

The engine 1 is mainly controlled by an engine control unit 3. The engine control unit 3 receives data from an engine control sensor group 20. The engine control sensor group 20 includes a speed sensor 20a, an engine revolution sensor 20b, an accelerator opening sensor 20c, an idle switch 20d, and the like. According to data from these sensors and engine control instructions, the engine control unit 3 including an engine controller 3a controls the engine 1 and fuel injector 2. The engine control unit 3 also includes a clutch controller 3b that controls the ON/OFF operation of an air conditioner (A/C) clutch 43 of the compressor 8.

The air conditioner 6 of the vehicle has a refrigeration cycle unit 7a and an air conditioning unit 7b. The air conditioning unit 7b includes an evaporator 12 and provides a temperature-adjusted air flow. The refrigeration cycle unit 7a includes the variable capacity compressor 8, a condenser 9, a liquid tank 10, a temperature-sensitive automatic expansion valve 11, the evaporator 12, and coolant piping (not represented with a specific reference numeral) that connects the components 8 to 11 to one another.

The compressor 8 includes the A/C clutch 43 (FIG. 2) to connect and disconnect the compressor 8 to and from the engine 1, which serves as a driving source. When the A/C clutch 43 is turned off, no driving force is transmitted from the engine 1 to the compressor 8, and therefore, the compressor 8 stops. When the A/C clutch 43 is turned on, driving force is transmitted from the engine 1 to the compressor 8 to drive the compressor 8. When driven, the compressor 8 compresses a low-temperature, low-pressure gaseous coolant and provides the condenser 9 with a high-temperature, high-pressure compressed liquid coolant.

The condenser 9 is arranged in front of the radiator 4, so as to be exposed to an air flow when the vehicle is running and a air flow from an electric fan 15. The high-temperature, high-pressure liquid coolant from the compressor 8 is cooled by the air flow passing through the condenser 9 to a condensation point and becomes a high-pressure, middle-temperature liquid coolant that flows into the liquid tank 10.

The liquid tank 10 removes water and foreign matter from the high-pressure, middle-temperature liquid coolant and separates liquid from gas. The separated liquid coolant is passed from the liquid tank 10 to the expansion valve 11.

The expansion valve 11 abruptly expands the high-pressure, middle-temperature liquid coolant into a low-pressure, low-temperature atomized liquid coolant. The atomized liquid coolant flows to the evaporator 12.

The evaporator 12 is arranged in a duct of the air conditioning unit 7b, which is located in a vehicle interior. The evaporator 12 cools air passing through the duct. The atomized liquid coolant passing through the evaporator 12 evaporates to remove heat from air passing through the evaporator 12, thereby cooling the air. The low-temperature, low-pressure gaseous coolant from the evaporator 12 flows to the compressor 8.

The air conditioning unit 7b is arranged in the vehicle interior and blows a temperature-adjusted air flow into the vehicle interior. The air conditioning unit 7b includes a casing 39 defining the duct 39a, an intake 40 arranged at an upstream end of the duct 39a, to take air into the duct 39a, a blower fan 16 arranged downstream from the intake 40, the evaporator 12 arranged downstream from the blower fan 16, and outlet door (not shown) for adjusting the openings of the outlet 39b of the duct 39a that is provided at a downstream end of the duct 39a and communicated with the vehicle interior.

The intake 40 includes an inside air intake 40a to take air from the vehicle interior, an outside air intake 40b to take air from the outside of the vehicle, and an intake door 40c to adjust the openings of the inside and outside air intakes 40a and 40b.

The blower fan 16 is driven by a blower fan motor 19. When the blower fan 16 is driven, the intake 40 takes inside and/or outside air into the duct 39a, and the air is blown toward the evaporator 12 that cools the air and sends the cooled air through the outlet 39b into the vehicle interior.

The variable capacity compressor 8 will be explained in detail.

First, a structure of the compressor 8 will be explained with reference to FIGS. 2 and 3.

In FIG. 2, the compressor 8 has a housing 22. The housing 22 defines cylinder bores 51 circumferentially formed around an axial line at regular intervals, a suction chamber 50 and a discharge chamber 49 formed on a top-dead-center side of the cylinder bores 51, and a crankcase 48 formed on a bottom-dead-center side of the cylinder bores 51. In each cylinder bore 51, a piston 27 reciprocates. The housing 22 supports a rotary shaft 24 that is freely rotatably in the crankcase 48. The clutch 43 of the compressor 8 connects and disconnects driving torque from the engine 1, serving as a driving source, to and from the rotary shaft 24. The rotary shaft 24 has a conversion mechanism 26 (26a, 26b, 26c, 26d, 26e) for converting rotation of the rotary shaft 24 into reciprocation of the pistons 27.

The conversion mechanism 26 includes, for example, a rotor 26a, a sleeve 26b, a hub 26c, a swash plate 26d, piston rods 26e, and the like. The rotor 26a is fixed to and rotatable with the rotary shaft 24. The sleeve 26b is slidable along the rotary shaft 24. The hub 26c is attached to the sleeve 26b, is freely inclinable relative to the rotary shaft 24, and is linked to the rotor 26a so that the hub 26c may rotate together with the rotary shaft 24. The swash plate 26d is attached to the hub 26c so that the swash plate 26d may incline relative to the rotary shaft 24. The piston rods 26e connect the swash plate 26d to the pistons 27.

When the clutch 43 is connected (turned on) to rotate the rotary shaft 24, each piston 27 reciprocates in the corresponding cylinder bore 50. The piston 27 draws coolant from the suction chamber 50 into the cylinder bore 50, compresses the drawn coolant in the cylinder bore 50, and discharges the compressed coolant from the cylinder bore 50 into the discharge chamber 49. Coolant is supplied from an upstream side to the compressor 8 and is guided through a suction port (not shown) into the suction chamber 50. Coolant in the discharge chamber 49 is discharged through a discharge port (not shown) to a downstream side of the compressor 8.

The piston 27 changes its stroke depending on an inclination angle of the swash plate 26d.

When the compressor 8 stops, a pressure Pc of the crankcase 48 becomes equal to a pressure (a low pressure Ps in the refrigeration cycle 7a) of the suction chamber 50. Then, the swash plate 26d and each piston 27 return to initial positions due to a force provided by first and second springs 52 and 53. According to the embodiment, the initial positions of the swash plate 26d and piston 27 are intermediate between a full-stroke position and a destroke (zero-stroke) position of the swash plate 26d and piston 27.

To enable the control of the discharge capacity of the compressor 8, the compressor 8 has a pressure introducing path 54 to connect the discharge chamber 49 to the crankcase 48, a pressure releasing path 55 to connect the crankcase 48 to the suction chamber 50, and a control valve 13 having a valve plug 31a to change the area of one (the pressure introducing path 54 according to the embodiment) of the pressure introducing path 54 and pressure releasing path 55.

Changing the opening of the valve plug 31a of the control valve 13 changes the flow rate of high-pressure coolant flowing from the discharge chamber 49 to the crankcase 48 through the pressure introducing path 54, thereby changing the pressure of the crankcase 48. This results in changing a pressure difference between a pressure on the top-dead-center side of the piston 27 (i.e., the pressure Ps of the suction chamber 50) and a pressure on the bottom-dead-center side of the piston 27 (i.e., the pressure Pc of the crankcase 48), thereby changing a piston stroke, i.e., the discharge capacity of the compressor 8.

FIG. 3 shows the details of the control valve 13. The control valve 13 has a valve case 30 partly defining the pressure introducing path 54 and a plunger 31 that reciprocates in the valve case 30. The plunger 31 is integral with the valve plug (ball valve) 31a, a diaphragm 32, and a solenoid core of a electromagnetic coil 35 as an actuator. Lift of the plunger determines a sectional area of the pressure introducing path 54. The diaphragm 32 serves as a pressure sensitive part on which the suction pressure Ps of the suction chamber 50, i.e., the low pressure Ps of the refrigeration cycle 7a acts. Electromagnetic force produced by the electromagnetic coil 35, when the coil 35 is energized, is applied to the plunger 31 to move the plunger 31. Each axial end of the plunger 31 receives a spring force from set springs 33 and 34. The set springs 33 and 34 and diaphragm 32A determine a set pressure of the valve plug 31a.

The diaphragm 32 responds to the low pressure Ps. When the low pressure Ps decreases, the diaphragm 32 moves the valve plug 31a in a valve opening direction. When the low pressure Ps increases, the diaphragm 32 moves the valve plug 31a in a valve closing direction.

When the electromagnetic coil 35 is energized to produce electromagnetic force, the valve plug 31a moves in the valve closing direction. Namely, the electromagnetic force of the coil 35 can change the set pressure of the valve plug 31a.

The electromagnetic coil 35 receives a control pulse signal or an external control signal from a capacity controller 14b of an air-conditioner control unit 14 (to be explained later). The control pulse signal has a duty factor, and an electromagnetic force proportional to the duty factor is applied to the plunger 31. The applied electromagnetic force changes the set pressure of the valve plug 31a, thereby chanting a lift (valve opening) of the valve plug 31a. A change in the lift (valve opening) of the valve plug 31a changes a flow rate of high-pressure coolant flowing from the discharge chamber 49 to the crankcase 48 through the pressure introducing path 54. This operation results in changing the inclination of the swash plate 26d to change the piston stroke.

Figure 6:
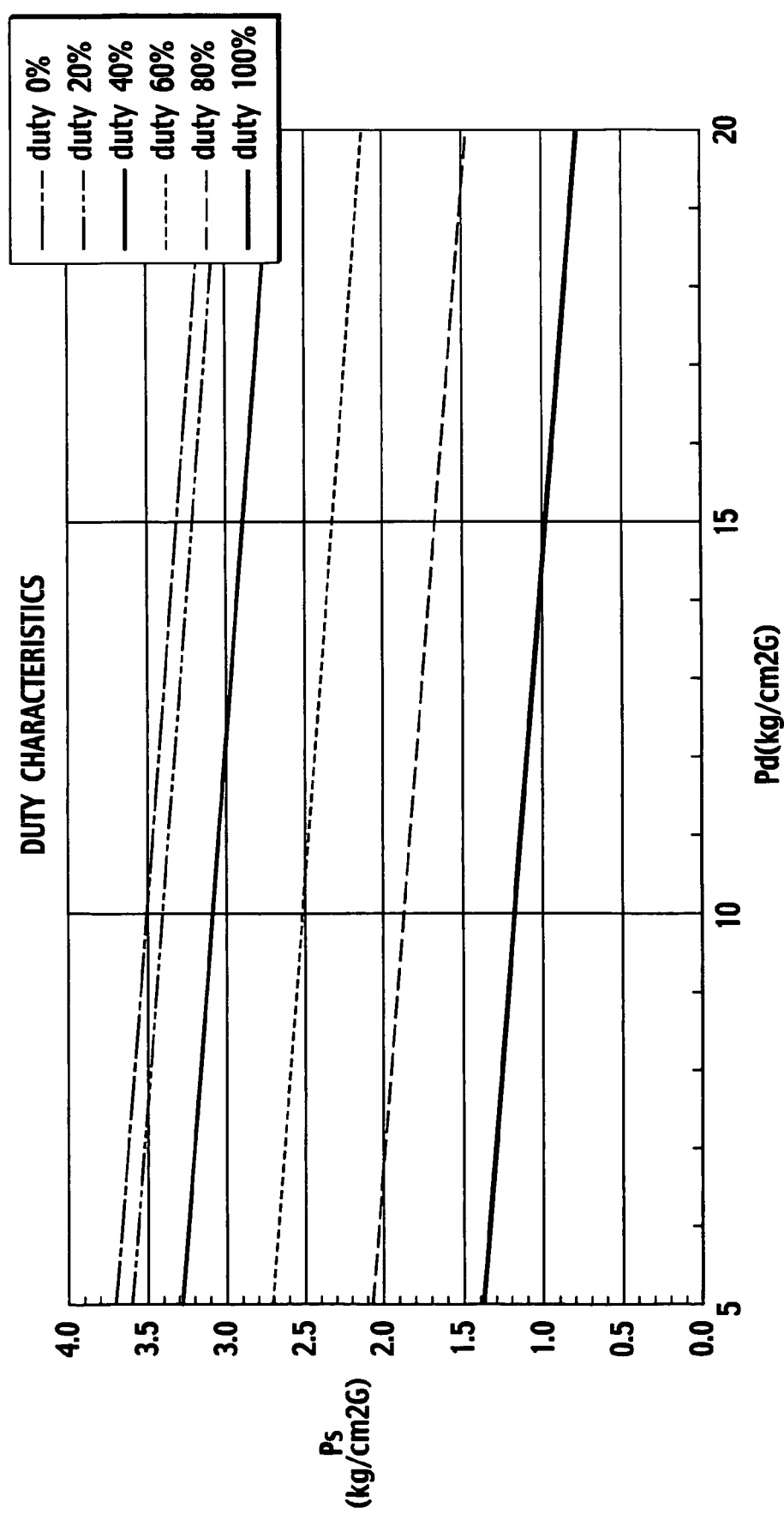
FIG. 6 is a graph showing characteristic curves of compressor suction pressure and compressor discharge pressure with different duty factors in the air conditioner of FIG. 1.

When the electromagnetic coil 35 is deactivated (duty factor of 0%), the discharge pressure (the high pressure of the refrigeration cycle 7a) Pd and suction pressure (the low pressure of the refrigeration cycle 7a) Ps follow a duty-factor-0% curve (dot-and-dash curve) shown in FIG. 6.

In the duty-factor-0% state, an assumption is made that load on the evaporator 12 changes to extremely increase the suction pressure Ps (for example, 5 Kg/cm² G). The pressure of 5 Kg/cm² G acts on the diaphragm 32 to push down the valve plug 31a to a totally closed position. At the totally closed position, no high-pressure coolant is introduced from the discharge chamber 49 to the crankcase 48 through the pressure introducing path 54, and coolant in the crankcase 48 is released through the pressure releasing path 55 to the suction chamber 50. As a result, the pressure of the crankcase 48 gradually decreases to the suction pressure Ps, thereby establishing a full-stroke (maximum capacity) state. Namely, the quantity of coolant circulating through the refrigeration cycle 7a increases to gradually decrease the suction pressure Ps. When the suction pressure Ps approaches the duty-factor-0% curve, the suction pressure Ps acting on the diaphragm 32 decreases to lift the valve plug 31a and increase the opening of the valve plug 31a. This operation results in increasing the flow rate of high-pressure coolant from the discharge chamber 49 into the crankcase 48 through the pressure introducing path 54, thereby increasing the pressure Pc of the crankcase 48. Namely, pressure acting on the back of the piston 27 gradually increases to gradually reduce the piston stroke, and a relationship between the pressures Ps and Pd stabilizes in a capacity controlled state along the duty-factor-0% curve.

If the duty factor is changed, the relationship between the pressures Pd and Ps stabilizes along a curve (FIG. 6) corresponding to the changed duty factor.

For example, if the duty factor is changed to 60%, the pressure relationship of the compressor 8 and refrigeration cycle 7a, i.e., the relationship between the discharge pressure Pd and the suction pressure Ps will follow a duty-factor-60% curve of FIG. 6.

In the duty-factor-60% state, an assumption is made that load on the evaporator 12 changes to extremely increase the suction pressure (low pressure) Ps (for example, 5 Kg/cm² G). The pressure of 5 Kg/cm² G acts on the diaphragm 32 to push down the valve plug 31a. The pressure of the crankcase 48 gradually decreases to the suction pressure Ps of the suction chamber 50, thereby establishing a full-stroke (maximum capacity) state. The quantity of coolant circulating through the refrigeration cycle 7a increases to gradually decrease the suction pressure Ps. When the suction pressure Ps approaches the duty-factor-60% curve, the suction pressure Ps acting on the diaphragm 32 decreases to lift the valve plug 31a. This operation results in increasing the pressure acting on the back of the piston 27, thereby gradually reducing the piston stroke. The low pressure Ps and high pressure Pd stabilize to establish a capacity controlled state along the duty-factor-60% curve.

In this way, the suction pressure Ps of the compressor 8 can be approximated according to the duty factor and the discharge pressure Pd of the compressor 8.

The air conditioner 6 is mainly controlled by the air-conditioner control unit 14 and partly by the engine control unit 3.

In FIG. 1, the air-conditioner control unit 14 is connected to the engine control unit 3 with a bidirectional communication line. The air-conditioner control unit 14 receives data from an air-conditioner control sensor group 21. The sensor group 21 includes standard sensors provided for the air conditioner 6, such as an air-conditioner (A/C) switch 21a, a mode switch 21b, a defrost switch 21c, an auto switch 21d, a fresh air (FRE) switch 21e, a recirculation (REC) switch 21f, a temperature adjust switch 21g, an OFF switch 21h, an interior temperature sensor 21i to detect a temperature in the vehicle interior, an ambient temperature sensor 21j to detect a temperature outside the vehicle, an insolation sensor 21k, an evaporator exit temperature sensor 21l to detect an air temperature at the exit of the evaporator 12, a water temperature sensor 21m, a coolant pressure sensor 21n to detect a coolant pressure on the discharge side of the compressor 8, and the like.

The air-conditioner control unit 14 controls the compressor 8, blower fan motors 17 and 19, intake door 40, and the like according to data from the above-mentioned sensors and air-conditioner control instructions.

The air-conditioner control unit 14 includes the compressor controller 14a, a fan motor controller 14e, and an intake controller 14f as shown in FIG. 1.

The fan motor controller 14e receives a target interior temperature set by a passenger through the temperature adjust switch 21g and data from the sensors of the air-conditioner control sensor group 21, calculates a flow rate of air to be supplied from the air conditioning unit 7b, and according to the calculated flow rate, controls the fan motor 17 of the electric fan 15 through a PWM (pulse width modulation) module 18, thereby controlling a flow rate of the electric fan 15. At the same time, the fan motor controller 14e controls the fan motor 19 of the electric fan 16, to control a flow rate of the electric fan 16. The fan motors 15 and 19 may be directly or indirectly controlled with the engine control unit 3.

If the fresh air (FRE) switch 21e is pushed or if a control signal to establish an outside air mode (fresh air mode) is provided, the intake controller 14f drives a door driver 41 of the intake door 40c to close the inside air intake 40a and open the outside air intake 40b so that fresh air is guided into the duct of the air conditioning unit 7b. If the recirculation (REC) switch 2 if is pushed or if a control signal to establish an inside air mode (recirculation mode) is provided, the intake controller 14f drives the door driver 41 of the intake door 40c to open the inside air intake 40a and close the outside air intake 40b so that inside air is introduced into the duct of the air conditioning unit 7b.

The compressor controller 14a includes the capacity controller 14b and torque calculator 14c.

The capacity controller 14b controls the control valve 13 of the compressor 8. The capacity controller 14b receives a target interior temperature set by a passenger with the temperature adjust switch 21g and data from the sensors, calculates a target conditioned air temperature supplied from the air conditioning unit 7b, finds, according to the calculated target conditioned air temperature, a target air temperature at the exit of the evaporator 12, calculates a duty factor to bring an actual air temperature at the exit of the evaporator 12 to the calculated target air temperature at the exit of the evaporator 12, and transfers the calculated duty factor to the control valve 13.

In this way, the capacity controller 14b provides the control valve 13 with a control pulse signal having a duty factor that determines a coolant discharge of the compressor 8. If the capacity controller 14b provides the control valve 13 with a maximum capacity signal having a maximum duty factor of 100%, the valve plug 31a of the control valve 13 moves to the closed position. Then, no pressure is introduced from the discharge chamber 49 to the crankcase 48 through the pressure introducing path 54. As a result, the pressure of the crankcase 48 decreases, the swash plate 26d inclines to a maximum inclination angle, and the piston 27 takes a full-stroke position. Consequently, the discharge of the compressor 8 increases to the maximum.

If the capacity controller 14b provides the control valve 13 with a minimum capacity signal having a minimum duty factor of 0%, the valve plug 31a of the control valve 13 moves to an open position. Then, pressure is introduced from the discharge chamber 49 into the crankcase 48 through the pressure introducing path 54. As a result, the pressure of the crankcase 48 increases, the swash plate 26d inclines to a minimum inclination angle, and the piston 27 takes a destroke position. Consequently, the discharge of the compressor 8 decreases to the minimum.

In this way, the capacity controller 14b adjusts a duty factor to adjust a flow rate of high-pressure coolant to be introduced from the discharge chamber 49 into the crankcase 48 through the pressure introducing path 54, thereby controlling the coolant discharge of the compressor 8.

In a steady-state operation, the capacity controller 14b works in a normal mode to calculate a duty factor according to a target air temperature at the exit of the evaporator 12 and an actual air temperature at the exit of the evaporator 12 provided by the sensor 21l. The capacity controller 14b may work in a minimum duty factor mode and a maximum duty factor mode. In the maximum duty factor mode, the capacity controller 14b maintains the maximum duty factor (100%). In the minimum duty factor mode, the capacity controller 14b maintains the minimum duty factor (0%).

Calculations of a steady-state torque and a start torque of the compressor 8 will be explained.

The torque calculator 14c calculates a drive torque (load torque) of the compressor 8. According to the embodiment, the torque calculator 14c calculates a start torque Tk during a predetermined period of time (four seconds in the embodiment) after a start of the compressor 8, and after the predetermined period of time, calculates a steady-state torque Ts (Tsn, Tsf).

First, calculating a steady-state torque Ts (Tsn, Tsf) in a steady operation will be explained with reference to FIGS. 5 to 11.

Figure 5:
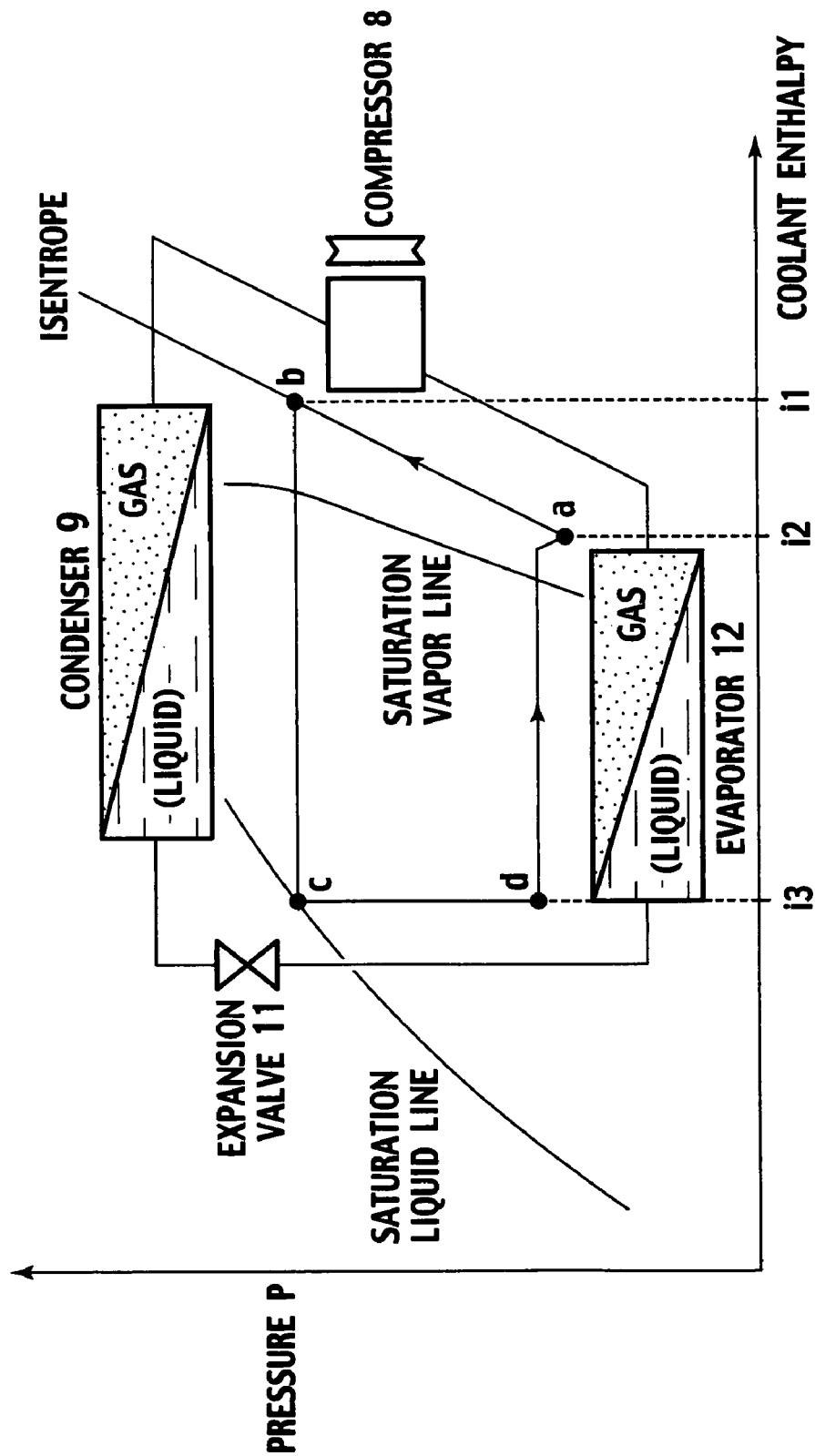
FIG. 5 is a view showing a refrigeration cycle in the air conditioner of FIG. 1 and a Mollier chart of the refrigeration cycle.
Figure 7:
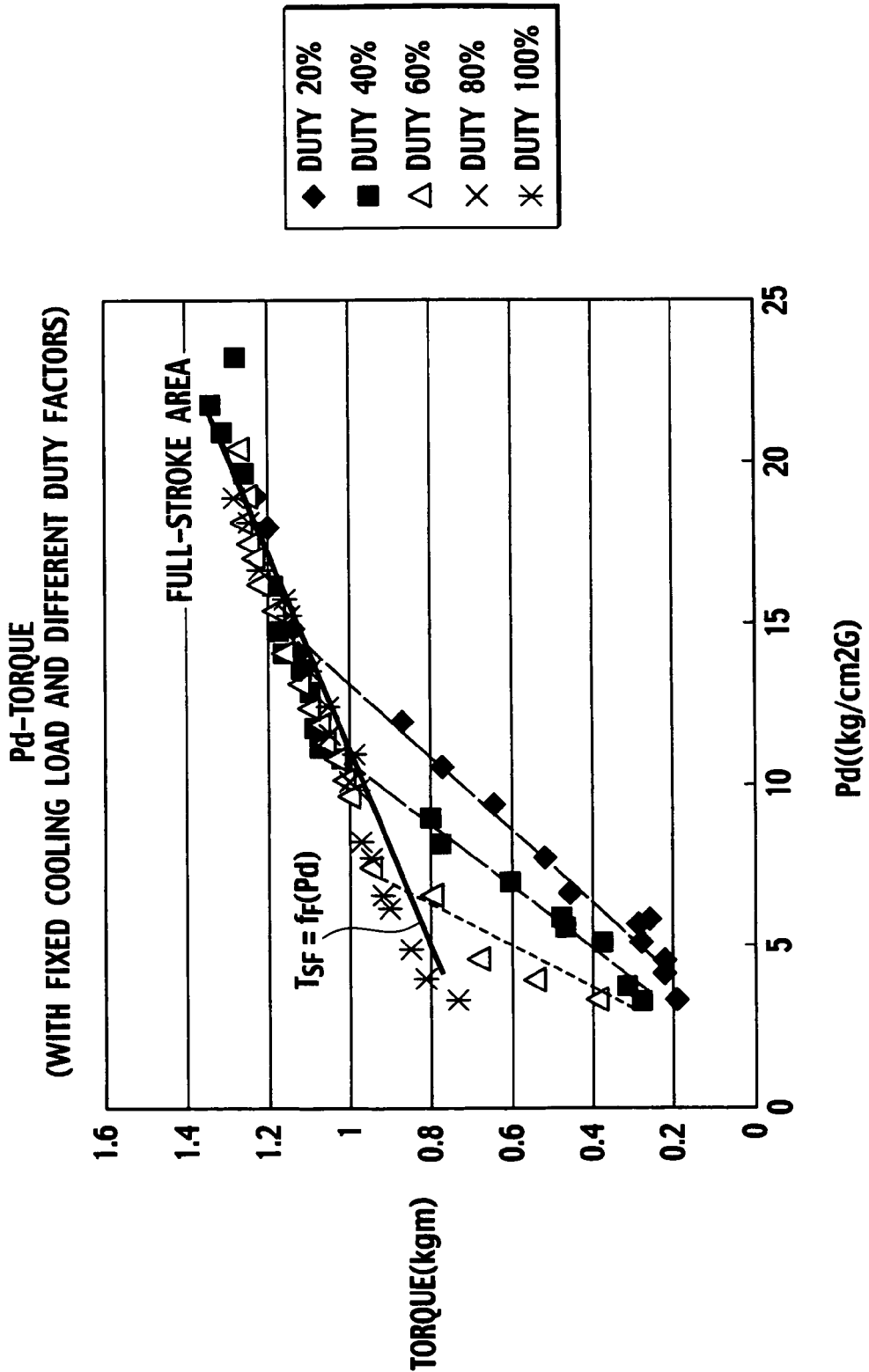
FIG. 7 is a graph showing characteristic curves of compressor discharge pressure and torque with a constant load on the refrigeration cycle (evaporator) and different duty factors.
Figure 8:
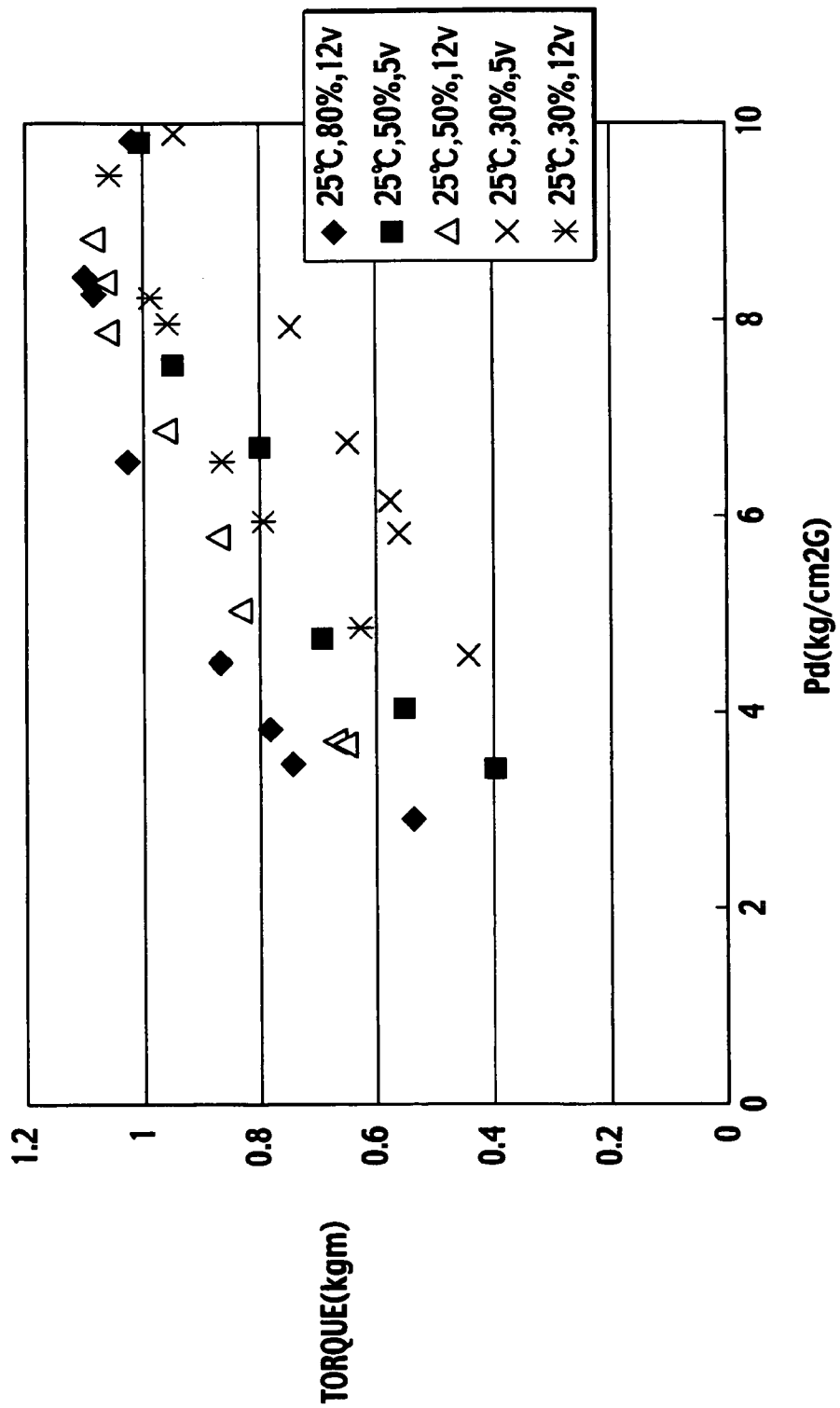
FIG. 8 is a graph showing compressor discharge pressure and torque with different loads on the refrigeration cycle (evaporator)
Figure 9:
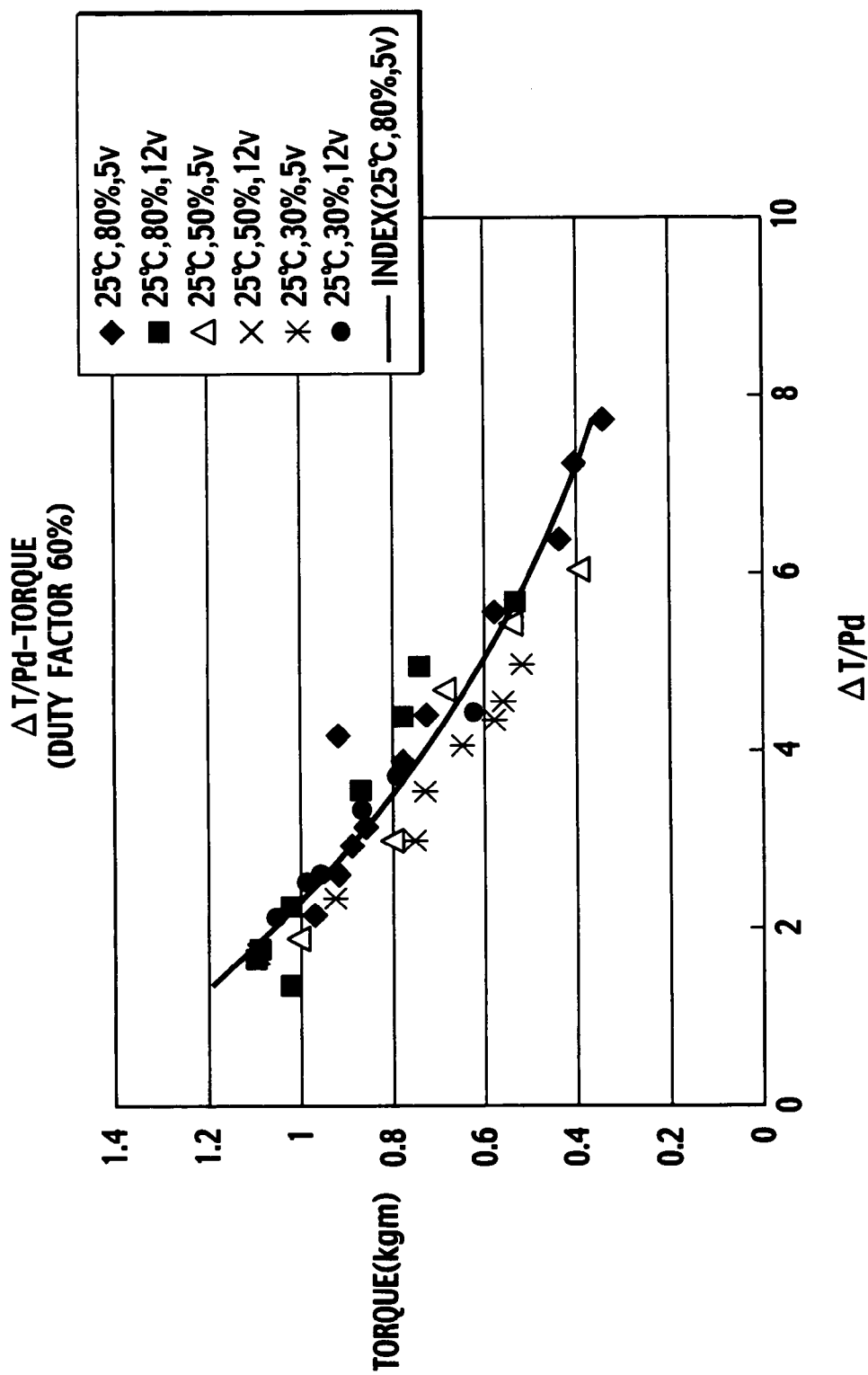
FIG. 9 is a graph showing a characteristic curve of torque and compressor discharge pressure with a constant duty factor of 60%.
Figure 10:
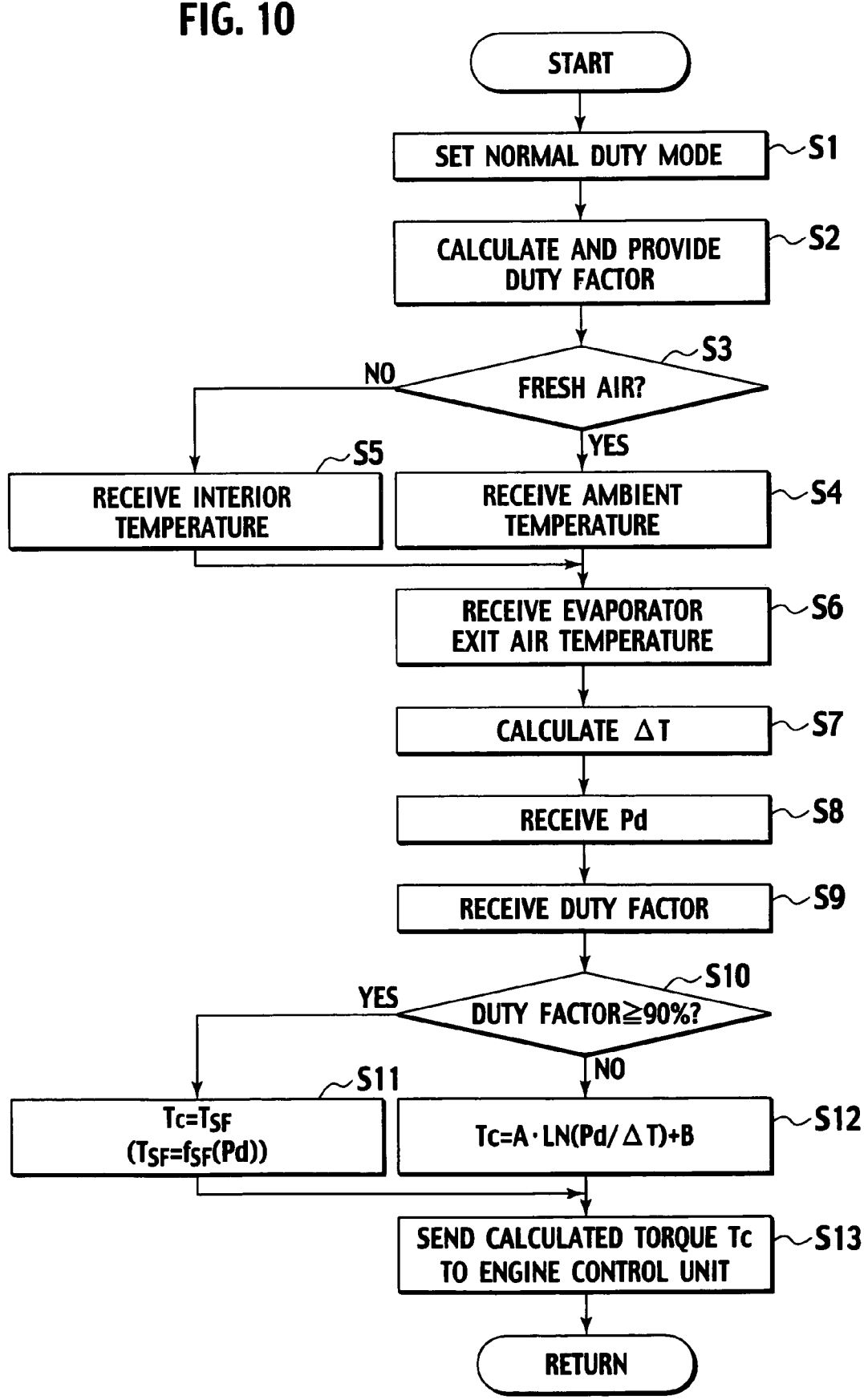
FIG. 10 is a flowchart showing a process of calculating steady-state torque of the air conditioner of FIG. 1.
Figure 11:
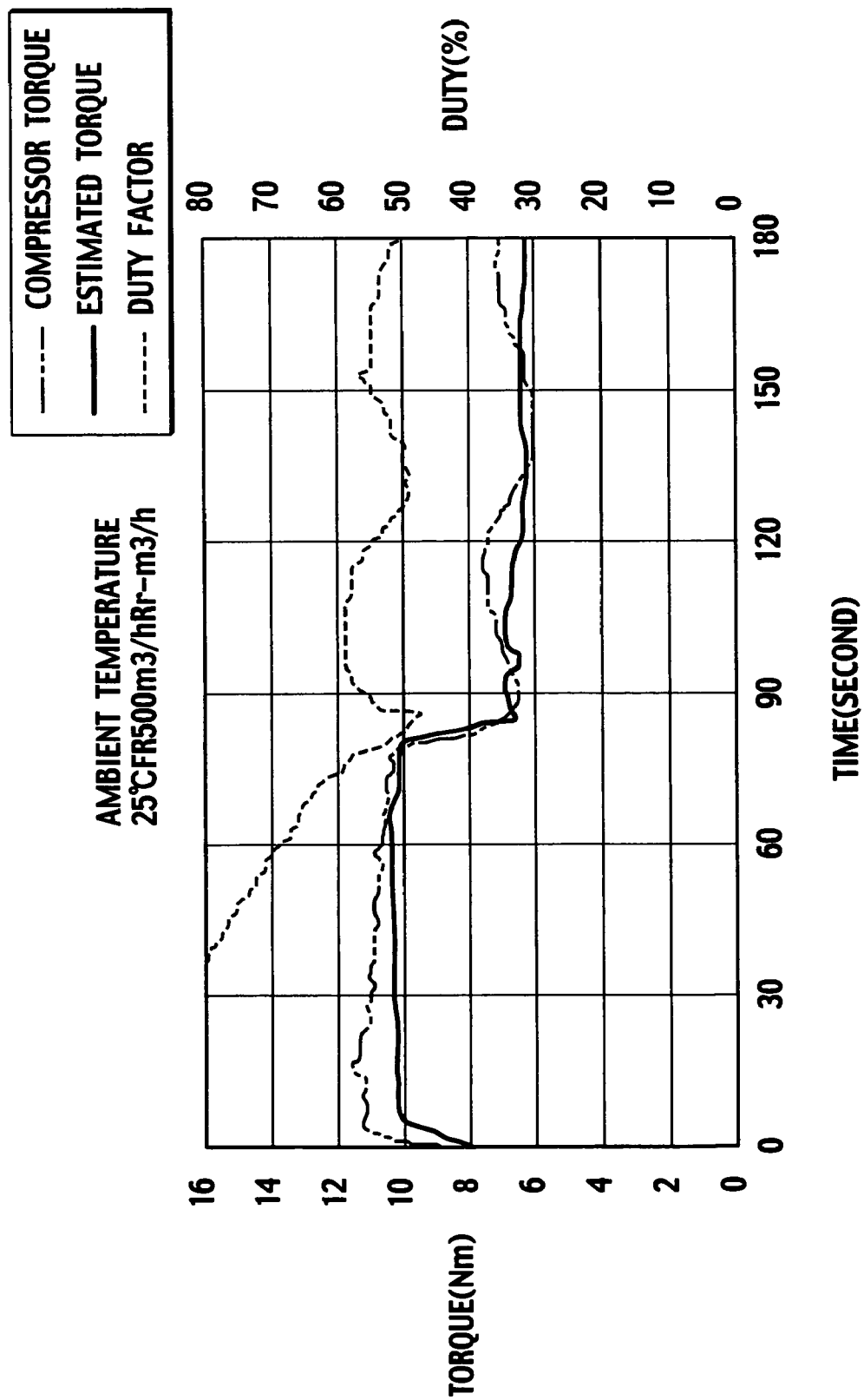
FIG. 11 is a graph showing characteristic curves of estimated torque and actual torque of the air conditioner of FIG. 1.

FIG. 5 shows a Mollier chart of the refrigeration cycle 7a, FIG. 6 shows characteristic curves of the compressor suction pressure Ps and compressor discharge pressure Pd with different duty factors, FIG. 7 shows characteristic curves of the compressor discharge pressure Pd and torque with a constant refrigerating cycle load (evaporator load) and different duty factors, FIG. 8 shows the compressor discharge pressure Pd and torque with different refrigerating cycle loads (the load being determined by the temperature (° C.) and humidity (%) of intake air of the evaporator 12 and a blower voltage (V)) and a fixed duty factor (60%), FIG. 9 shows a characteristic curve of torque and a ratio of evaporator temperature difference $\Delta T$ to the compressor discharge pressure Pd with a fixed duty factor of 60% and different refrigerating cycle loads (the load being determined by the temperature (° C.) and humidity (%) of intake air of the evaporator 12 and a blower voltage (V)), FIG. 10 is a flowchart showing a process of calculating a steady-state torque, and FIG. 11 shows characteristic curves of torque estimated according to the embodiment and actual torque.

The embodiment calculates a steady-state torque Ts (Tsn, Tsf) according to torque expressions (12) and (13) to be explained later. The torque expressions (12) and (13) have, as input parameters, a temperature difference $\Delta T$ between air temperatures at the entrance and exit of the evaporator 12, a compressor discharge coolant pressure Pd, an external control signal having a duty factor for controlling the control valve 13, and the number of revolutions Nc of the compressor 8.

The torque expressions (12) and (13) will be explained.

A torque Ts of the variable capacity compressor 8 is theoretically expressed as follows:

$$Ts = (i1-i2) \times Gr \times \eta m / Nc \quad (1)$$

where i1 is an enthalpy of coolant discharged from the compressor 8, i2 is an enthalpy of coolant supplied to the compressor 8, Gr is a flow rate of the coolant, ηm is the mechanical efficiency of the compressor 8, and Nc is the number of revolutions of the compressor 8.

As shown in FIG. 5, the enthalpy i1 of coolant discharged from the compressor 8 and the enthalpy i2 of coolant supplied to the compressor 8 may be expressible with functions i1=f(Pd) and i2=f(Ps). Accordingly, the expression (1) is written as follows:

$$Ts = \{f(Pd) - f(Ps)\} \times Gr \times \eta m / Nc \quad (2)$$

In the expression (2), ηm changes according to a compression ratio (Pd/Ps) and the coolant flow rate Gr and is specific to the compressor 8. Nc is a known value, and therefore, the torque can be estimated if the compressor discharge pressure Pd, compressor suction pressure Ps, and coolant flow rate Gr are obtained.

The compressor discharge pressure Pd is readable from a detected value of the coolant pressure sensor 21n. According to the compressor 8 of the embodiment, the compressor suction pressure Ps is controlled by the duty factor of a control pulse signal supplied to the control valve 13, and therefore, the suction pressure Ps can be found from the compressor discharge pressure Pd and duty factor. As shown in FIG. 6, the compressor suction pressure Ps and compressor discharge pressure Pd follow a specific characteristic curve depending on a duty factor. Accordingly, the compressor suction pressure Ps can be approximated from the duty factor of an external control signal and the compressor discharge pressure Pd. Namely, the expression (2) can be written as follows:

$$Ts = \{f(Pd) - f(Pd, \text{duty factor})\} \times Gr \times \eta m / Nc \quad (3)$$

This expression (3) can be written as follows:

$$Ts = F1(Pd, \text{duty factor}) \times Gr \times \eta m / Nc \quad (4)$$

Then, variables in the expression (4) are solved. FIG. 7 shows characteristic curves of compressor discharge pressure Pd and torque Ts with the refrigeration cycle 7a (evaporator suction side) receiving a constant load defined by a temperature of 25° C., a humidity of 50%, and an air flow rate corresponding to a blower voltage of 5 V and with different duty factors. It is understood from FIG. 7 that the torque Ts can be estimated from the compressor discharge pressure Pd and duty factor.

With the constant load on the refrigeration cycle 7a (evaporator suction side), the coolant flow rate Gr can be expressed by a function f1(Pd, Ps) and ηm by a function f2(Pd, Pd). Accordingly, the expression (4) can be written as follows:

$$Ts = F(Pd, \text{duty factor}) / Nc \quad (5)$$

A change in torque due to a change in the refrigerating cycle load (evaporator suction load) will be examined. It is assumed that the temperature of intake air of the evaporator 12 is constant at 25° C. When the humidity of evaporator intake air and an air flow rate (a voltage of the blower fan motor 19) are changed, a correlation is established between the compressor discharge pressure Pd and the torque Ts as shown in FIG. 8. Namely, if torque changes in a variable range and if refrigerating cycle load (evaporator intake air load) changes, the coolant flow rate Gr changes. Accordingly, some elements are needed to estimate the coolant flow rate Gr. Such elements are examined from cooling performance based on evaporator load:

$$Qevap = (i3-i2) \times Gr \quad (6)$$

$$Gr = Qevap/(i3-i2) \quad (7)$$

where Qevap is an endothermic quantity of coolant in the evaporator, i3 is an enthalpy of coolant at the entrance of the evaporator 12, i2 is an enthalpy of coolant at the exit of the evaporator 12 (which is equal to the enthalpy of coolant on the suction side of the compressor 8, and therefore, the same reference mark is employed).

An endothermic quantity of air of the evaporator 12 is expressed as follows:

Qevap(air)={(air endothermic quantity before evaporator)−(air endothermic quantity after evaporator)}×(evaporator air flow rate)/(air specific volume)

The coolant endothermic quantity of the evaporator 12 is equal to the air endothermic quantity of the evaporator 12 and is proportional to a temperature difference between air at the evaporator entrance and air at the evaporator exit. Accordingly, the coolant endothermic quantity of the evaporator 12 can be estimated from the temperature difference ($\Delta t$) between air temperatures before and after the evaporator 12 and can be expressed as a function Qevap=f($\Delta t$).

As shown in FIG. 5, the enthalpy i3 at the entrance of the evaporator 12 is expressed as a function i3=f(Pd), and the enthalpy at the exit of the evaporator 12 is expressed as a function i2=f(Ps). Accordingly, the expression (7) can be written as follows:

$$Gr = f3(\Delta t)/f4(Pd) - f(Pd, \text{duty factor}) \quad (8)$$

The expression (8) includes a denominator that is a function of Pd and duty factor, and therefore, is written as follows:

$$Gr = f3(\Delta t)/F2(Pd, \text{duty factor}) \quad (9)$$

From the expressions (9) and (4), the torque Ts can be expressed as follows:

$$Ts = F1(Pd, \text{duty factor}) \times \{f3(\Delta t)/F2(Pd, \text{duty factor})\}/Nc \quad (10)$$

The expression (10) can be written as follows:

$$Ts = f(\Delta t)/f(Pd, \text{duty factor})/Nc \quad (11)$$

Based on the expression (11), $\Delta t/Pd$ and torque Ts can be plotted as a graph of FIG. 9. This graph shows that differences in evaporator load (the humidity of intake air and an air flow rate) can be absorbed. In this way, the torque Ts of the compressor 8 may be calculated from an air temperature difference $\Delta t$ between the entrance and exit of the evaporator 12, a compressor discharge pressure Pd, the duty factor of a control pulse signal for controlling the control valve 13, and the number of revolutions Nc of the compressor 8.

To easily calculate the torque Ts of the compressor 8 during an idling operation and a fuel-cut decelerating operation, a constant value (a standard number of revolutions for idling and fuel-cut deceleration) is employed as the number of revolutions Nc of the compressor 8 in the expression (11). In addition, the temperature difference $\Delta t$ before and after the evaporator 12 and the compressor discharge pressure Pd are handled as variable terms. Values obtained from measurements on an actual vehicle with a given duty factor and temperature difference Δt before and after the evaporator 12 are used as constant terms A and B to provide the following expression:

$$Ts = A \times LN(Pd/\Delta t) + B \quad (12)$$

The torque calculator 14c stores, in an external or internal memory (not shown), the expression (12) and values for the constant terms A and B obtained by measurements under various conditions and calculates the torque Ts by entering data for the variable terms and constant terms of the expression (12).

The steady-state torque Tsn of the compressor 8 under a discharge capacity controlled state is dependent on the compressor discharge pressure Pd and the temperature difference Δt before and after the evaporator 12 as shown in the expression (12). The full-stroke torque (steady-state full-stroke torque) Tsf of the compressor 8 can be estimated from a function of only the compressor discharge pressure Pd like a fixed capacity compressor as follows:

$$Tsf = fsf(Pd) \quad (13) \text{ (FIG. 7)}$$

A process of calculating the steady-state torque Ts (during idling and fuel-cut deceleration) of the compressor 8 according to the expressions (12) and (13) will be explained with reference to FIG. 10.

A predetermined time (four seconds in this embodiment) after a start of the compressor 8, a start operation shifts to a steady operation, and the calculation of a steady-state torque Ts starts. In step S1 of FIG. 10, the capacity controller 14b sets a normal mode duty factor for the control valve 13. In step S2, the capacity controller 14b employs a normal controller 121 to calculate a target evaporator exit air temperature, calculates a duty factor according to the target evaporator exit air temperature and an actual evaporator exit air temperature, and provides the control valve 13 with a control signal having the calculated duty factor. In step S3, the intake controller 14f determines whether the intake door 40 is at the outside air introducing position or at the inside air circulating position according to information from the fresh air (FRE) switch 21e and recirculation (REC) switch 21f. If the intake door 40 is at the outside air introducing position, step S4 is carried out in which the torque calculator 14c receives a temperature detected by the ambient temperature sensor 21j as an evaporator entrance air temperature, delays and corrects the received temperature signal, and provides a recognized ambient temperature signal. If the intake door 40 is at the inside air circulating position, step S5 is carried out in which the torque calculator 14c receives a temperature detected by the interior temperature sensor 21i as an evaporator entrance air temperature signal, delays and corrects the received temperature signal, and provides a recognized interior temperature signal.

In step S6, the torque calculator 14c receives a temperature detected by the evaporator exit temperature sensor 21l as an evaporator exit air temperature signal, delays and corrects the received temperature signal, and provides a recognized evaporator exit temperature signal.

In step S7, the torque calculator 14c calculates a temperature difference Δt before and after the evaporator 12 according to the above-mentioned data. Namely, if the intake door 40 is at the outside air introducing position, the torque calculator 14c subtracts the recognized evaporator exit temperature from the recognized ambient temperature, to find determine the temperature difference Δt. If the intake door 40 is at the inside air circulating position, the torque calculator 14c subtracts the recognized evaporator exit temperature from the recognized interior temperature, to determine the temperature difference Δt.

In step S8, the torque calculator 14c fetches a pressure detected by the coolant pressure sensor 21n, delays and corrects the detected pressure signal, and provides a recognized compressor discharge pressure signal.

In step S9, the torque calculator 14c receives a duty factor of the control pulse signal provided by the capacity controller 14b to the control valve 13.

In step S10, the torque calculator 14c checks to see if the duty factor is equal to or greater than 90%. If the duty factor is equal to or greater than 90%, step S11 is carried out in which a steady-state full-stroke calculator 107 (FIG. 4) of the torque calculator 14c calculates a steady-state full-stroke torque Tsf according to the steady-state full-stroke torque expression (13) (FIG. 7). If the duty factor is smaller than 90%, step S12 is carried out in which a steady-state torque calculator 105 of the torque calculator 14c calculates a steady-state torque Ts according to the steady-state torque expression (12). In step S13, the torque calculator 14c sends the calculated steady-state torque Tc=Ts (Tsn or Tsf) to the engine control unit 3. This process is repeated to calculate the steady-state torque Ts (Tsn or Tsf) of the variable capacity compressor 8 in real time. According to the sent steady-state torque Ts (Tsn or Tsf), the engine control unit 3 controls an intake air quantity (a fuel mixture supply quantity) so as to prevent engine stall and excessive idling in an idling mode.

A modification of the steady-state torque calculation will be explained. According to the modification, the torque calculator 14c stores the expression (11) in an external or internal memory (not shown), the expression (11) involving, as variables, an air temperature difference Δt between the entrance and exit of the evaporator 12, a compressor discharge pressure Pd, a duty factor, and the number of revolutions Nc of the compressor 8. By entering data received from the sensors into the variables of the expression (11), the torque calculator 14c calculates a torque of the compressor 8. The modification additionally employs the number of revolutions Nc of the compressor 8 as data for calculating a torque of the compressor 8. The modification can reduce the quantity of data to be stored in the memory. The modification can calculate a torque of the compressor 8 not only in the idling mode and fuel-cut deceleration mode of the air conditioner 6 but also in any other operation mode of the air conditioner 6.

The number of revolutions Nc of the compressor 8 in the expression (11) may be replaced with a constant value (a standard number of revolutions for idling and fuel-cut deceleration), and the replaced expression may be stored in the memory. This may reduce the quantity of data to input and make the calculation of the expression simpler for idling and fuel-cut deceleration in which the number of revolutions Nc of the compressor 8 is substantially constant.

A method of calculating torque at a start of the variable capacity compressor 8 according to an embodiment will be explained.

Figure 4:
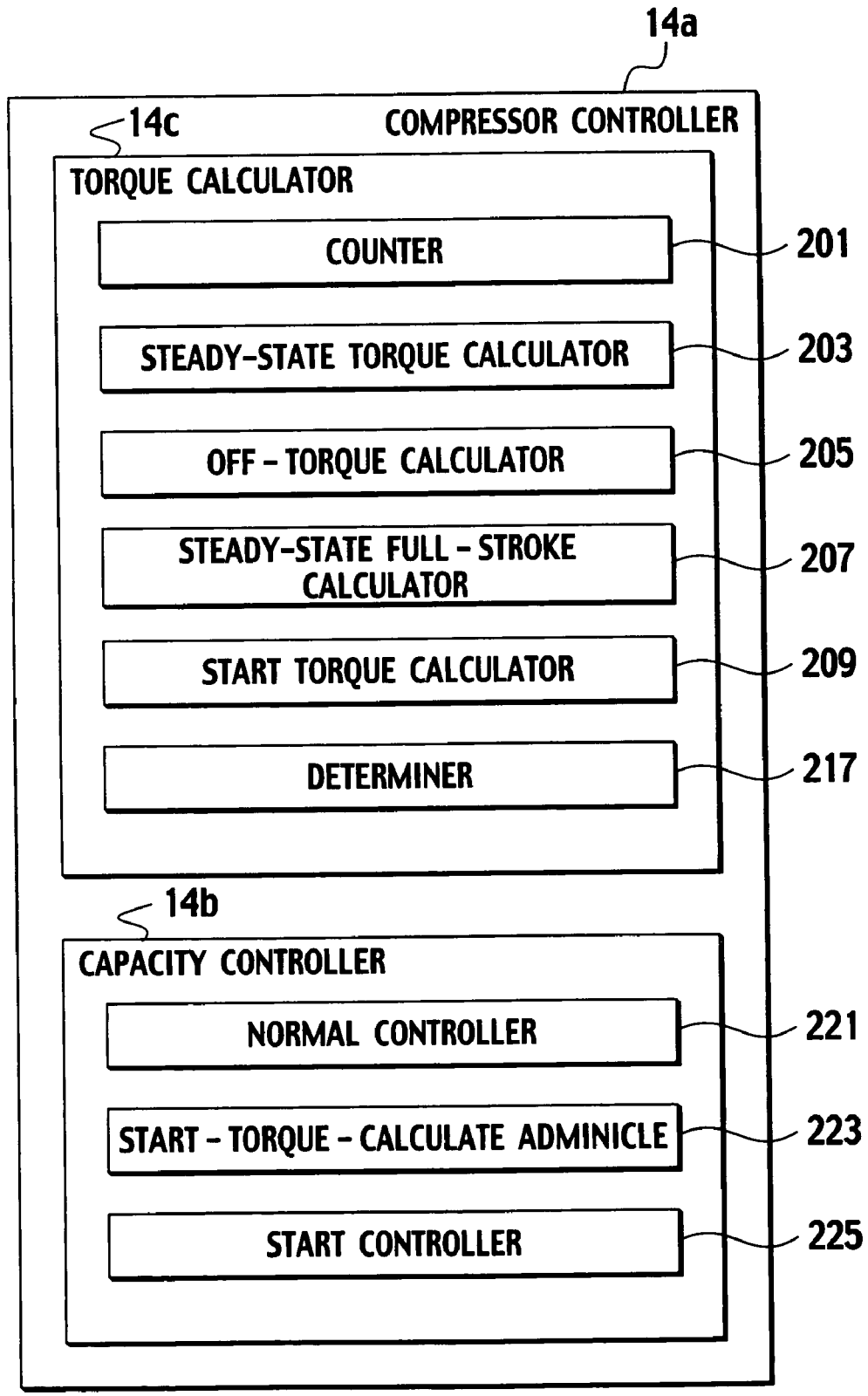
FIG. 4 is a block diagram showing a compressor controller of the air conditioner of FIG. 1.

The compressor torque calculating method employs the sensor group 21 of FIG. 1, which detects internal and external states of the air conditioner 6, and a compressor controller 14a of FIG. 4. In FIG. 4, the compressor controller 14a includes an OFF-torque calculator 205 (corresponding to steps S2 to S12 and S22) for calculating a steady-state torque according to states of the air conditioner 6 detected by the sensor group 21 just before the clutch 43 is turned off, a start torque calculator 209 (corresponding to step S45) for calculating a start torque according to states of the air conditioner 6 detected by the sensor group 21 after the clutch 43 is turned on, a steady-state full-stroke calculator 207 (corresponding to step S46) for calculating a steady-state full-stroke torque on an assumption that piston 27 was in a full-stroke state according to the states of the air conditioner 6 detected by the sensor group 21 after the clutch 43 is turned on, and a determiner 217 (corresponding to step S47) for providing, when an elapsed time after the clutch 43 is turned on is less than a predetermined time, the engine control unit 3 with a maximum one of the torque values calculated by the OFF-torque calculator 205, start torque calculator 209, and steady-state full-stroke calculator 207.

Figure 12:
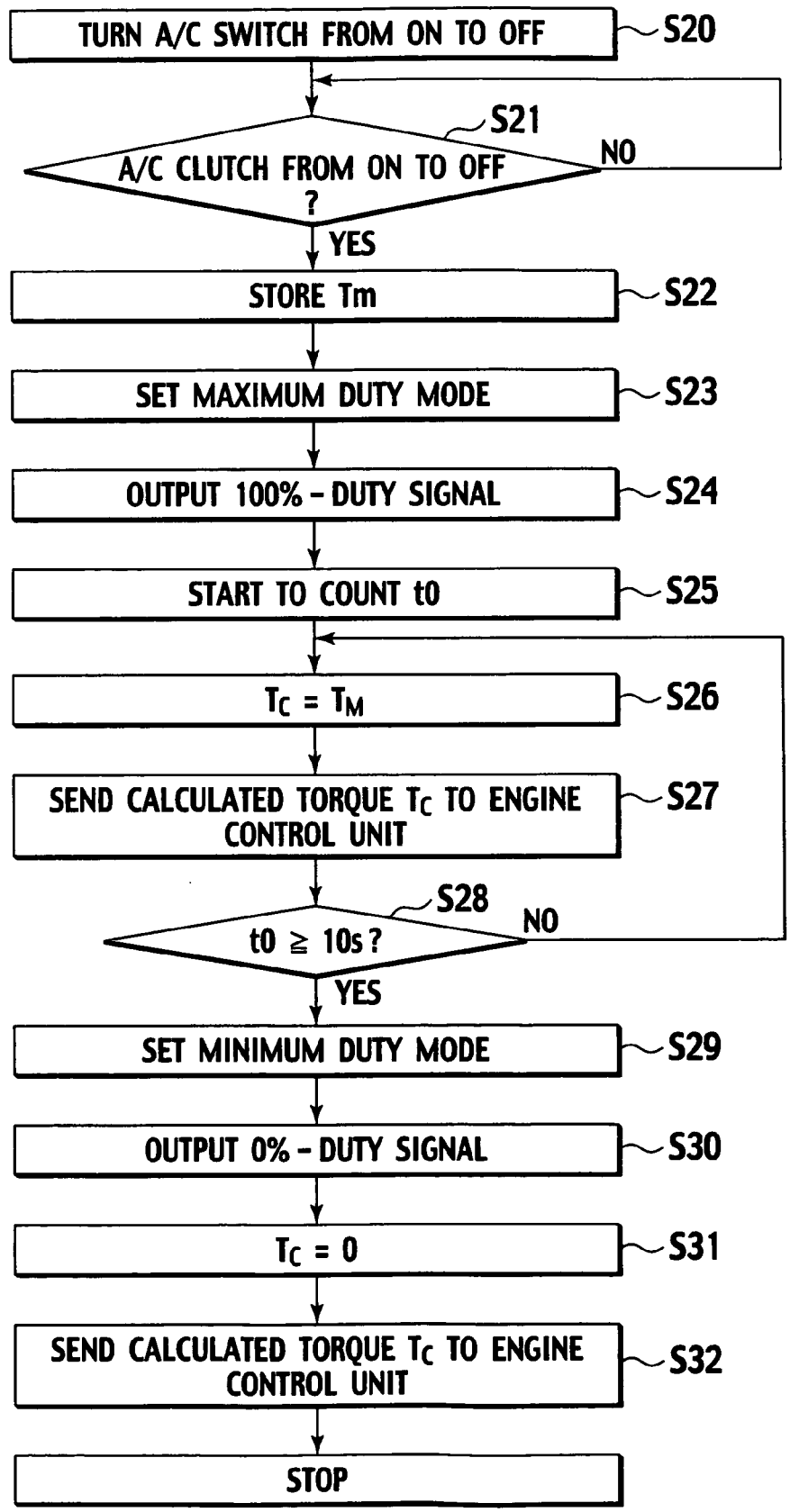
FIG. 12 is a flowchart showing a process of stopping the compressor of the air conditioner of FIG. 1.
Figure 13:
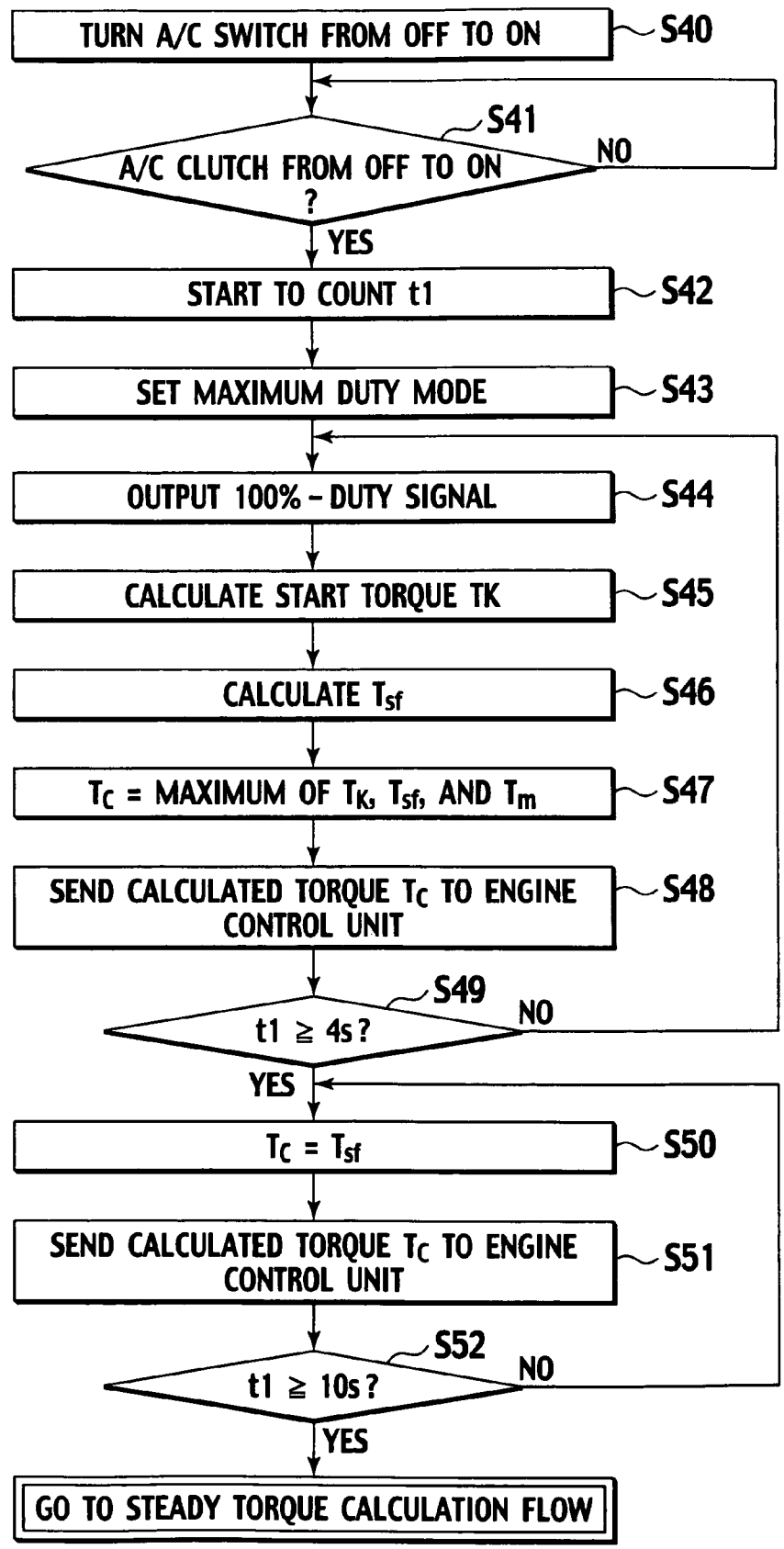
FIG. 13 is a flowchart showing a process of restarting the compressor of the air conditioner of FIG. 1.
Figure 14:
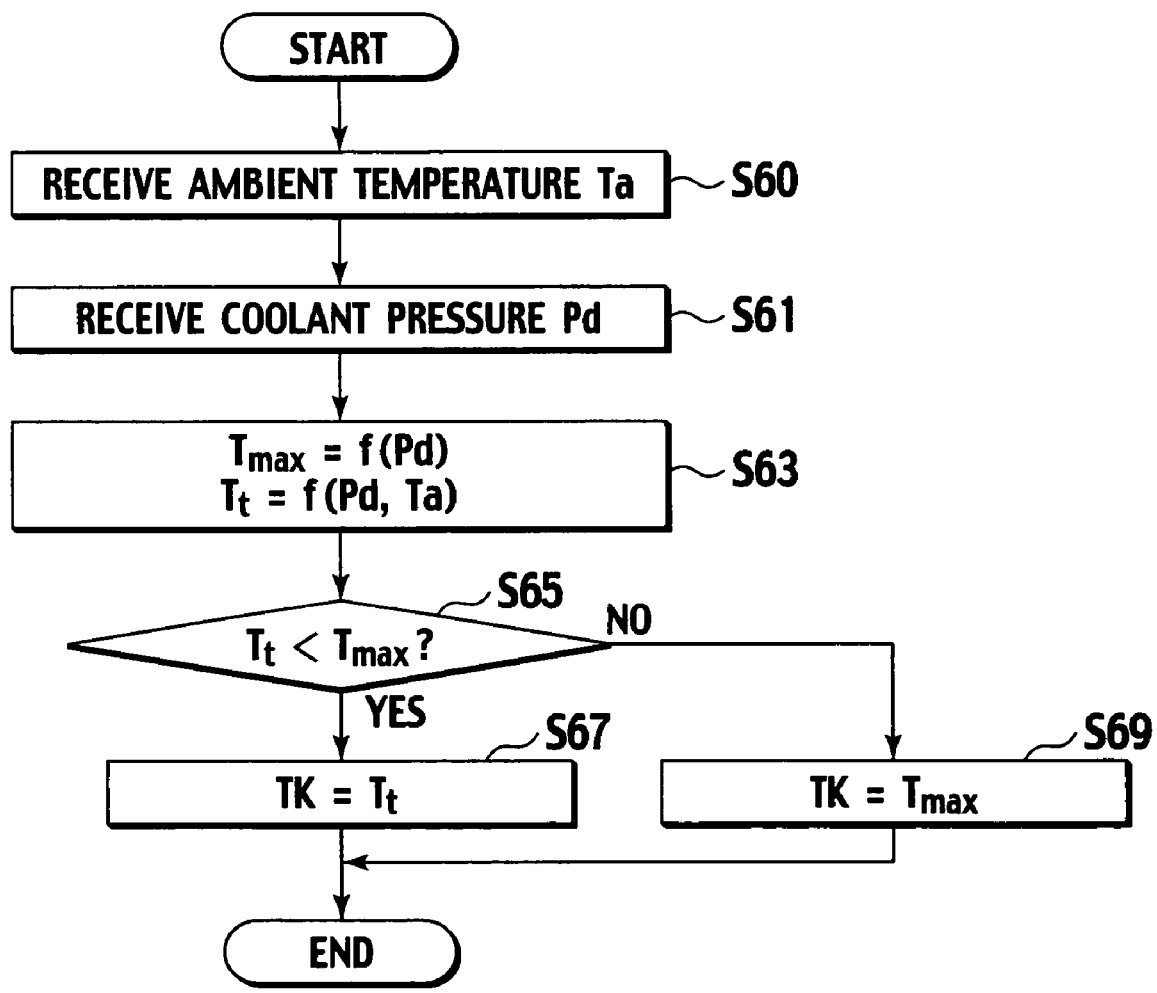
FIG. 14 is a flowchart showing a process of calculating a start torque of the compressor of the air conditioner of FIG. 1.
Figure 15:
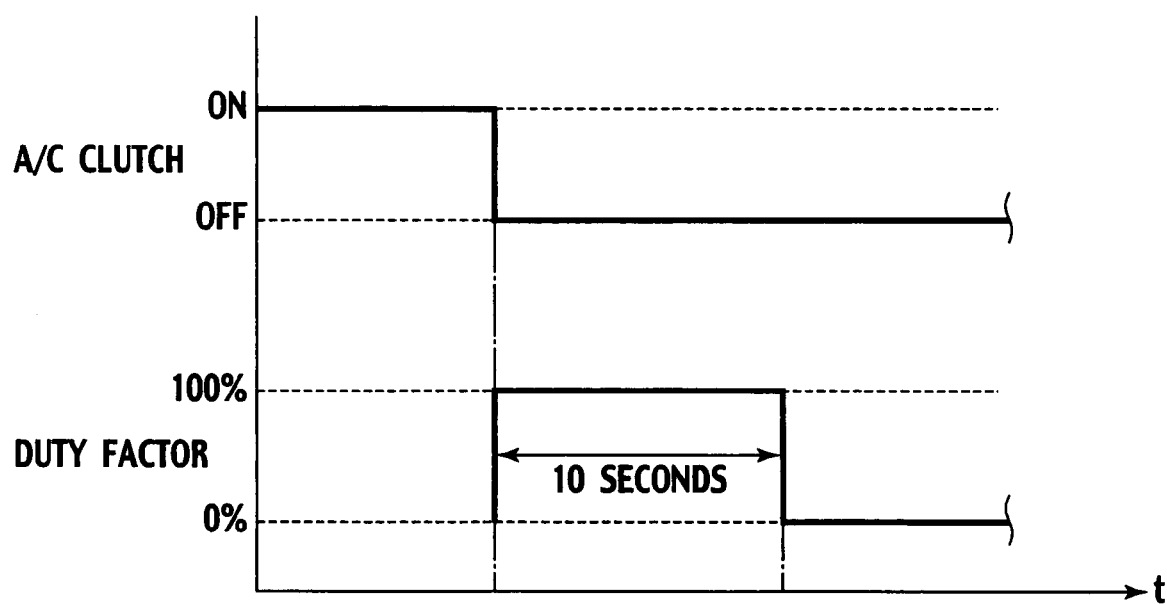
FIG. 15 is a timing chart showing an ON/OFF state of an air-conditioner clutch and an output duty factor when stopping the compressor of the air conditioner of FIG. 1.
Figure 16:
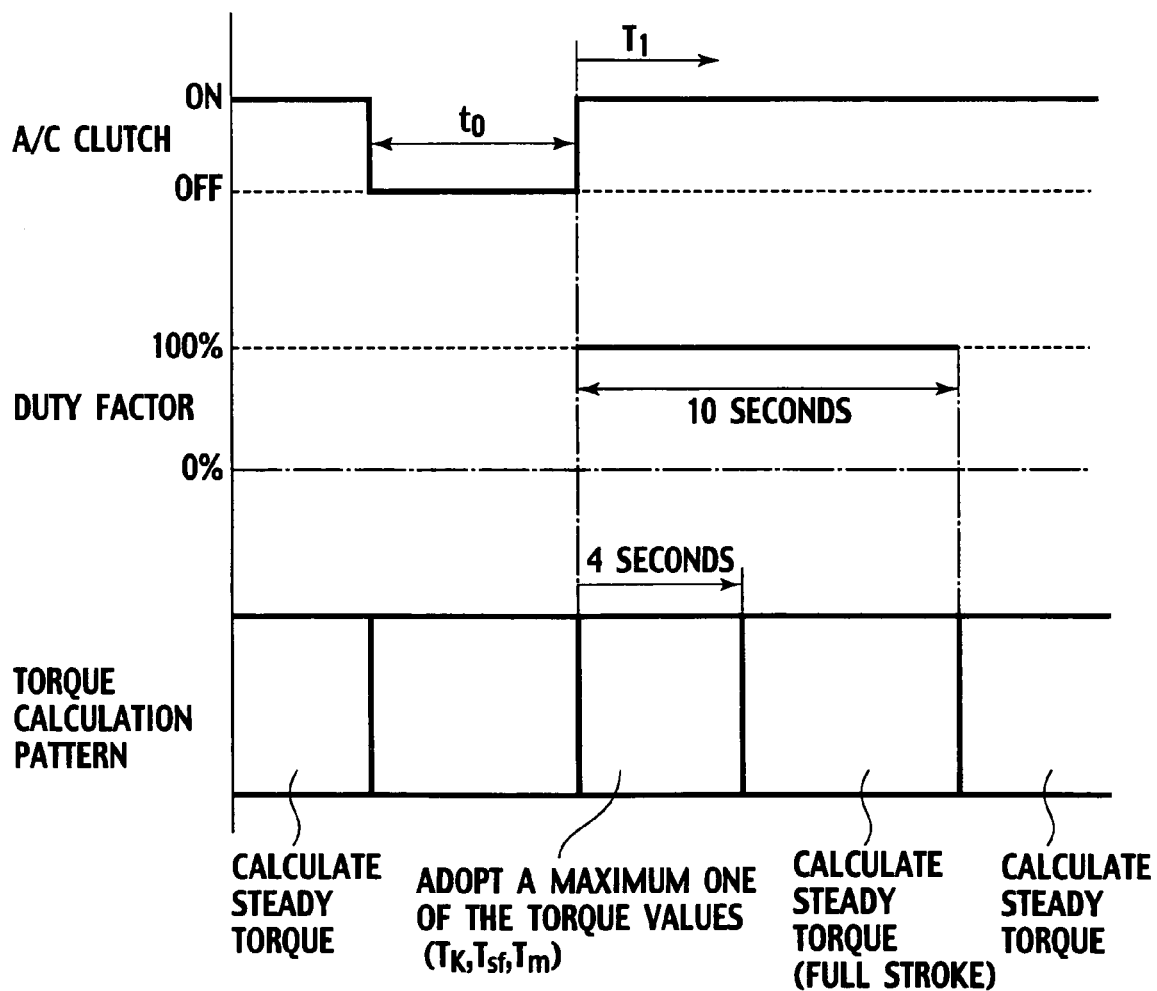
FIG. 16 is a timing chart showing an ON/OFF state of the air-conditioner clutch, an output duty factor, and a torque calculating pattern when restarting the compressor of the air conditioner of FIG. 1.
Figure 17:
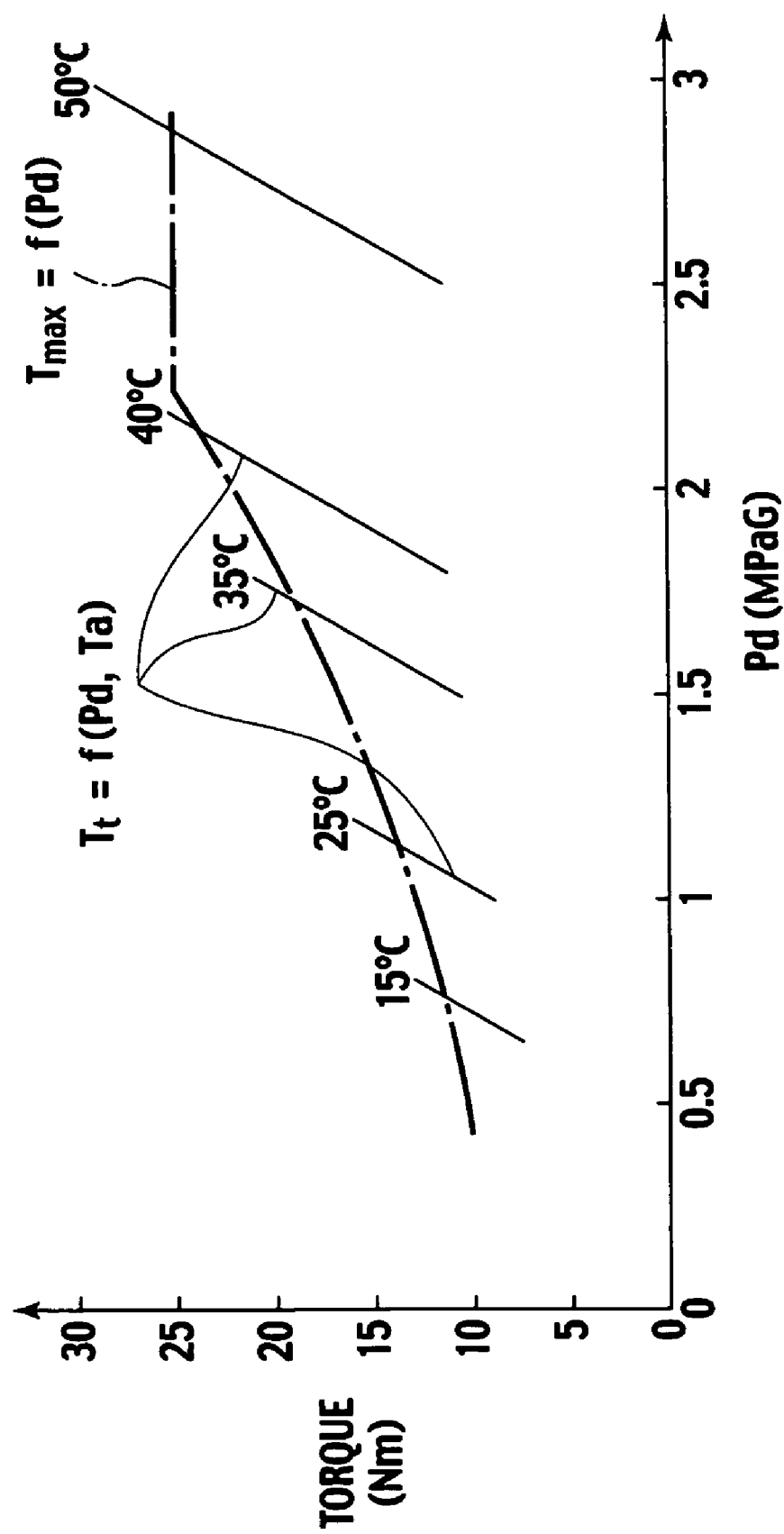
FIG. 17 is a graph showing experimental characteristic curves of start torque of the compressor of the air conditioner of FIG. 1.

Calculating torque at a start of the compressor 8 will be explained in detail with reference to FIGS. 12 to 17 in which FIG. 12 is a flowchart showing a process of stopping the compressor 8, FIG. 13 is a flowchart showing a process of restarting the compressor 8, FIG. 14 is a flowchart showing a process of calculating a start torque of the compressor 8, FIG. 15 is a timing chart showing an ON/OFF state of the clutch 43 and an output duty factor when stopping the compressor 8, FIG. 16 is a timing chart showing an ON/OFF state of the clutch 43, an output duty factor, and a torque calculating pattern when restarting the compressor 8, and FIG. 17 is a graph showing experimental characteristic curves of start torque of the compressor 8.

Operation of the compressor controller 14a when the variable capacity compressor 8 stops will be explained. In step S20 of FIG. 12, the air-conditioner (A/C) switch 21a is switched from ON to OFF, and the compressor controller 14a starts a process to stop the compressor. In step S21, the compressor controller 14a determines whether or not the engine control unit 3 has changed the air-conditioner (A/C) clutch 43 from ON to OFF. If the clutch 43 has been turned off, the torque calculator 14c stores, in step S22, an OFF torque (Tc=Tm) in a memory, the OFF torque being a steady-state torque calculated just before the clutch 43 has been turned off. The capacity controller 14b selects a maximum duty factor mode, in step S23, and provides the control valve 13 with a control pulse signal having a duty factor of 100% (FIG. 15), in step S24. In step S25, the counter 201 of the torque calculator 14c starts to count an OFF time t0 from the OFF point of the clutch 43. Until the OFF time t0 reaches ten seconds, the torque calculator 14c adopts the OFF torque Tm as a present torque and continuously provides the OFF torque Tm to the engine control unit 3 in steps S26, S27, and S28.

If ten seconds have passed after the compressor 8 is stopped in step S28, the capacity controller 14b selects a minimum duty factor mode, in step S29, and provides the control valve 13 with a control pulse signal having a duty factor of 0%, in step S30. The torque calculator 14c provides the engine control unit 3 with Tc=0 as a present torque in steps S31 and S32.

In this way, the capacity controller 14b according to the embodiment provides the control valve 13 with an external control signal having a duty factor of 100% for ten seconds (FIG. 15) after the clutch 43 is turned off to stop the compressor 8. The external control signal having a duty factor of 100% is identical to a maximum capacity operation signal. As a result, the control valve 13 is completely closed for ten seconds after the compressor 8 is stopped. This is to maintain a crankcase pressure Pc without abruptly changing the same when the compressor 8 is stopped. The control valve 13 at the closed position blocks the pressure introducing path 54 between the discharge chamber 49 and the crankcase 48, so that no high-pressure coolant flows from the discharge chamber 49 into the crankcase 48 through the pressure introducing path 54. On the other hand, the crankcase 48 and suction chamber 50 are always connected to each other through the pressure releasing path 55, and therefore, coolant in the crankcase 48 flows into the suction chamber 50 to equalize the pressure Pc of the crankcase 48 to a low pressure Ps of the suction chamber 50, thereby balancing and stabilizing the pressure Pc of the crankcase 48. Namely, the pressures of the crankcase 48 and suction chamber 50 gradually equalize with each other in a predetermined time (six seconds in this embodiment) after the compressor 8 has stopped.

In this way, high-pressure coolant in the discharge chamber 49 does not flow into the crankcase 48, and therefore, no sudden change occurs in the pressure of the crankcase 48. Due to this operation, the swash plate 26d and piston 27 behave in a stable manner to allow a start torque to be correctly estimated.

Operation of the compressor controller 14a when the variable capacity compressor 8 is restarted will be explained with reference to FIG. 13. In step S40, the air-conditioner (A/C) switch 21a is switched from OFF to ON. In step S41, the compressor controller 14a determines whether or not the engine control unit 3 has switched the air-conditioner (A/C) clutch 43 from OFF to ON. If the clutch 43 has been turned on, step S42 is carried out in which the counter 201 (FIG. 4) starts to count an ON time t1 from the ON point of the clutch 43. In step S43, the capacity controller 14b selects the maximum duty factor mode, and in step S44, provides the control valve 13 with a control pulse signal having a duty factor of 100% (FIG. 16). The capacity controller 14b continuously provides the control pulse signal having a duty factor of 100% for ten seconds. In response to the control pulse signal, the control valve 13 moves to the totally closed position, to stabilize a low pressure of the suction chamber 50 and increase an estimated accuracy of a start torque. The reason why the control pulse signal of duty factor 100% is continuously provided for ten seconds is because a time in which a suction pressure Ps of the suction chamber 50 stabilizes after a start of the compressor 8 is dependent on an ambient temperature Ta. For example, if the ambient temperature Ta is 35° C., it takes about six seconds to stabilize the suction pressure Ps, and if the ambient temperature Ta is 15° C., it takes about eight seconds. Accordingly, ten seconds are needed to ensure stability of the suction pressure Ps irrespective of an ambient temperature Ta.

In step S45, the torque calculator 14c calculates a start torque TK according to a map shown in FIG. 17. Step S45 corresponds to the start torque calculator 209 of FIG. 4. In step S46, the torque calculator 14c calculates a steady-state full-stroke torque Tsf according to the map of FIG. 7 on an assumption that each piston 27 is in a full-stroke state. Step S46 corresponds to the steady-state full-stroke calculator 207 of FIG. 4. In step S47, the torque calculator 14c selects a maximum one of the calculated start torque TK, calculated steady-state full-stroke torque Tsf, and OFF torque Tm stored in step S22. Step S47 corresponds to the determiner 217 of FIG. 4. In step S48, the torque calculator 14c provides the selected maximum value to the engine control unit 3. Steps S44, S45, S46, S47, and S48 are repeated for four seconds after the restart of the compressor 8.

If step S49 determines that the ON time t1 is equal to or greater than four seconds, i.e., if four seconds have passed from the restart of the compressor 8, the torque calculator 14c calculates, in step S50, a steady-state full-stroke torque Tsf according to the map of FIG. 7. This is because it is presumed that the piston 27 attains a full stroke four seconds after the restart of the compressor 8 at the duty factor of 100%. In step S51, the calculated steady-state full-stroke torque Tsf (=Tc) is sent to the engine control unit 3. Step S52 checks to see if the ON time t1 is equal to or greater than ten seconds. If the ON time t1 is equal to or greater than ten seconds, i.e., if ten seconds have passed from the restart of the compressor 8, the starting process ends, and the steady-state torque calculation process (FIG. 10), mentioned above, starts.

The details of calculation of the start torque TK will be explained with reference to FIG. 14.

In step S60, the torque calculator 14c receives an ambient temperature Ta from the ambient temperature sensor 21j, and, in step S61, a coolant pressure Pd from the coolant pressure sensor 21n on the high-pressure side.

In step S63, the torque calculator 14c finds a start torque Tt according to the ambient temperature Ta, the coolant pressure Pd, and the map of FIG. 17.

The map of FIG. 17 is prepared according to tests that start the compressor 8 from a stopped state and measure a start torque. In the map of FIG. 17, a start torque Tt is a function of an ambient temperature Ta and a high pressure Pd of the refrigeration cycle 7a. The map of FIG. 17 includes start torque characteristic curves Tt=f(Pd, Ta) indicated by continuous lines and a start torque upper limit curve Tmax indicated by a dot-and-dash line. Step S65 of FIG. 14 checks to see if the start torque Tt, determined from the map, is less than the upper limit Tmax. If the determined start torque Tt is less than the upper limit Tmax, step S67 employs the determined start torque Tt as the start torque TK. Here, the start torque Tt is for a full-stroke position of the pistons. The upper limit Tmax for Tt is dependent on mechanical factors of the compressor 8. If the determined start torque Tt is larger than the upper limit Tmax in step S65, the determined start torque Tt is abnormal, and therefore, the upper limit Tmax is adopted as the start torque TK in step S69.

Effects of the apparatus and method according to the above-mentioned embodiments will be summarized.

(i) The apparatus for calculating a torque of the variable capacity compressor 8 includes the sensor group 21 for detecting internal and external states of the air conditioner 6, the OFF-torque calculator 205 (corresponding to steps S2 to S12 and S22) for calculating and storing a steady-state torque according to states of the air conditioner 6 detected by the sensor group 21 just before the clutch 43 is turned off, the start torque calculator 209 (corresponding to step S45) for calculating a start torque according to states of the air conditioner 6 detected by the sensor group 21 after the clutch 43 is turned on, the steady-state full-stroke calculator 207 (corresponding to step S46) for calculating a steady-state full-stroke torque on an assumption that the compressor 8 was in a full-stroke state according to states of the air conditioner 6 detected by the sensor group 21 after the clutch 43 is turned on, and the determiner 217 (corresponding to step S47) for providing, when an elapsed time after the clutch 43 is turned on is less than a predetermined time, the engine control unit 3 with a maximum one of the torque values calculated by the OFF-torque calculator 205, start torque calculator 209, and steady-state full-stroke calculator 207. The method of calculating a torque of the compressor 8 includes detecting internal and external states of the air conditioner 6, calculating and storing a steady-state torque according to states of the air conditioner 6 detected just before the clutch 43 is turned off (steps S2 to S12 and S22), calculating a start torque according to states of the air conditioner 6 detected after the clutch 43 is turned on (step S45), calculating a steady-state full-stroke torque on an assumption that the compressor was in a full-stroke state according to states of the air conditioner 6 detected after the clutch 43 is turned on (step S46), and when a elapsed time after the clutch 43 is turned on is less than a predetermined time, providing the engine control unit 3 with a maximum one of the calculated torque values (steps S47 and S48).

When the compressor 8 is started, i.e., when the clutch 43 is turned on, the engine control unit 3 is provided with a maximum one of the three calculated torque values. This configuration prevents an engine stall that may occur if the engine control unit 3 is provided with a torque value that is less an actual torque value and secures the safety operation of the engine 1.

(ii) The start torque calculator 209 (corresponding to step S45) calculates a start torque according to a high pressure Pd of the refrigeration cycle 7a and an ambient temperature Ta both detected by the sensor group 21. Namely, the start torque is calculable with a small amount of information.

(iii) The steady-state full-stroke calculator 207 (corresponding to step S46) calculates a steady-state full-stroke torque according to a high pressure Pd of the refrigeration cycle 7a detected by the sensor group 21. Namely, the full-stroke torque Tsf is calculable with a small amount of information.

(iv) The OFF-torque detector 205 (corresponding to steps S2 to S12 and S22) calculates an OFF steady-state torque Tm according to a high pressure Pd of the refrigeration cycle 7a, a temperature difference $\Delta T$ between inlet and outlet air temperatures of the evaporator 12, the duty factor of an external control signal for controlling the control valve 13, and the number of revolutions Nc of the compressor 8 each detected by the sensor group 21. Namely, the OFF steady-state torque Tm is calculable with a small amount of information.

(v) The variable capacity compressor 8 includes the clutch 43 to connect and disconnect the engine 1 to and from the compressor 8, the rotary shaft 24 to be rotated by the rotation of the engine 1 when the clutch 43 is connected, the piston (coolant compressing member) 27 to reciprocate in response to the rotation of the rotary shaft 24, compress coolant supplied from the suction chamber 50, and discharge the compressed coolant into the discharge chamber 49, the pressure introducing path 54 connecting the discharge chamber 49 and crankcase 48 to each other, the pressure releasing path 55 connecting the crankcase 48 and suction chamber 50 to each other, and the control valve 13 to adjust an opening of one of the pressure introducing path 54 and pressure releasing path 55 and controllable by an external control signal. This configuration changes the pressure of the crankcase 48 to quickly control the capacity of the compressor 8.

(vi) The capacity controller 14b controls the control valve 13 with a maximum capacity operation signal when the clutch 43 is turned on, so that the piston 27 takes a full-stroke position. Bringing the piston 27 to the full-stroke position when the clutch 43 is turned on prevents the estimated start torque from deviating from an actual start torque, thereby improving an estimation accuracy of the start torque.

The air-conditioner switch 21a is employed to turn on and off the air-conditioner (A/C) clutch 43. Instead of the air-conditioner switch 21a, any other on/off control element may be employed to turn on and off the clutch 43. For example, it is possible to employ an element that turns off the clutch 43 when an air temperature at the exit of the evaporator 12 decreases below a predetermined temperature. In this case, the clutch 43 is frequently turned on and off according to the exit air temperature of the evaporator 12 to save energy, and the present invention is particularly effective for such a case.

The control valve 13 includes the pressure sensitive element (diaphragm) 32 to sense a suction pressure (low pressure) Ps of the refrigeration cycle 7a and move the valve plug 31a in a valve opening direction if the pressure Ps decreases and in a valve closing direction if the pressure Ps increases. This configuration can quickly ensure a coolant flow rate appropriate for the load on the evaporator 12, even if the duty factor of a control signal from the capacity controller 14b is unchanged.

The present invention is not limited to the embodiments mentioned above. Various modifications are possible without departing from the scope of the present invention.

For example, the control valve 13 of FIG. 3 that controls a valve opening in response to a suction pressure (low pressure) Ps may be a throttle and a pressure sensing element disclosed in Japanese Unexamined Patent Application Publication No. 2001-317467 may be provided to guide a discharge pressure (high pressure).

The swash plate 26d and piston 27 return to their initial positions when the compressor 8 establishes a pressure equilibrium. According to the embodiments, these initial positions are intermediate between a full-stroke position and a destroke position. The initial positions may be any other positions instead of the intermediate positions. In this case, a map used to estimate a start torque is prepared according to the optional initial positions.

The embodiments employ the duty factor of a control pulse signal to externally control the coolant discharge capacity of the compressor 8. Instead of the duty factor of a control pulse signal, any other electrical quantity may be used to control the coolant discharge capacity of the compressor 8.

The embodiments employ a vehicle engine as a driving source of the compressor 8. The driving source of the compressor 8 may be an electric motor.

The embodiments estimate a start torque TK from the map of FIG. 17 based on a high pressure Pd and an ambient temperature Ta. Any other map may be used to estimate the start torque TK.

The embodiments calculate a steady-state torque according to the maps of FIGS. 7 and 8, a high pressure Pd, a temperature difference $\Delta T$ between inlet and outlet air temperatures of the evaporator 12, the duty factor of an external control signal for controlling the control valve 13, and the number of revolutions Nc of the compressor 8. The steady-state torque may be calculated by the use of expressions 12 and 13 disclosed in Japanese Unexamined Patent Application Publication No. Hei-5-99156. Alternatively, the steady-state torque may be calculated according to the characteristics of a low pressure Ps and high pressure Pd determined by a duty factor (FIG. 6) and the expressions 12 and 13 disclosed in the Japanese Unexamined Patent Application Publication No. Hei-5-99156. Also, the steady-state torque may be calculated based on any other map for estimating the same.

Although the present invention has been described above by reference to certain embodiments, the present invention is not limited to them. Modifications and variations of the embodiments can be made without departing from the spirit or scope of the appended claims. The embodiments are only for illustrative purposes and are not intended to limit the present invention.

What is claimed is:

1. An apparatus for calculating torque of a variable capacity compressor, comprising:
   sensors configured to detect internal and external states of an air conditioner;
   an OFF-torque calculator configured to calculate and store a steady-state torque according to a state detected by the sensors just before a clutch is turned off;
   a start torque calculator configured to calculate a start torque according to a state detected by the sensors after the clutch is turned on;
   a steady-state full-stroke calculator configured to calculate a steady-state full-stroke torque, based on an assumption that the compressor was in a full-stroke-state according to a state detected by the sensors after the clutch is turned on; and
   a determiner configured to provide, when an elapsed time after the clutch is turned on is less than a predetermined time, a maximum one of the torque values calculated by the OFF-torque calculator, start torque calculator, and steady-state full-stroke calculator.

2. The apparatus of claim 1, wherein:
   the start torque calculator calculates a start torque according to a high pressure of a refrigeration cycle and an outside temperature outside the vehicle, both detected by the sensors.

3. The apparatus of claim 1, wherein:
   the steady-state full-stroke calculator calculates the steady-state full stroke torque according to a high pressure of a refrigeration cycle detected by the sensors.

4. The apparatus of claim 1, wherein:
   the OFF-torque calculator calculates a the steady-state torque according to a high pressure of a refrigeration cycle, a temperature difference between inlet and exit air temperatures of an evaporator, the duty factor of an external control signal for controlling a control valve of the compressor, and the number of revolutions of the compressor, each detected by the sensors.

5. The apparatus of claim 1, wherein the variable capacity compressor comprises:
   the clutch configured to connect and disconnect an engine to and from the compressor;
   a rotary shaft configured to be rotated by rotation of the engine when the clutch is connected;
   a crankcase;
   a discharge chamber;
   a suction chamber;
   a coolant compressing member configured to reciprocate in response to the rotation of the rotary shaft so as to compress coolant supplied from the suction chamber and discharge the compressed coolant into the discharge chamber;
   a pressure introducing path configured to connect the discharge chamber and crankcase to each other;
   a pressure releasing path configured to connect the crankcase and suction chamber to each other; and
   the control valve configured to adjust an opening of one of the pressure introducing path and pressure releasing path and to be controlled by an external control signal.

6. The apparatus of claim 5, further comprising:
   a capacity controller configured to control the control valve with a maximum capacity operation signal when the clutch is turned on, so that the coolant compressing member takes a full-stroke position.

7. The apparatus of claim 5, further comprising:
   clutch controller configured to turn off the clutch when the exit air temperature of the evaporator is less than a predetermined value.

8. The apparatus of claim 6, wherein:
   the capacity controller sets a target exit air temperature of the evaporator according to a target exit air temperature of an air condition unit and controls the control valve according to the target exit air temperature of the evaporator, thereby controlling the discharge of the compressor.

9. The apparatus of claim 5, wherein the control valve comprises:
   a valve plug; and
   a pressure sensitive element configured to move the valve plug in a valve opening direction when a low pressure of the refrigeration cycle decreases and in a valve closing direction when the low pressure increases.

10. A method of calculating torque of a variable capacity compressor, comprising:

detecting internal and external states of an air conditioner; calculating and storing a steady-state torque according to a state detected just before a clutch connecting the compressor to an engine is turned off;

calculating a start torque according to a state detected after the clutch is turned on;

calculating a steady-state full-stroke torque based on an assumption that the compressor was in a full-stroke-state according to a state detected after the clutch is turned on; and determining and providing a maximum one of the three calculated torque values, when an elapsed time after the clutch is turned on is less than a predetermined time.

* * * * *